(12) United States Patent
Sugimoto

(10) Patent No.: US 10,248,303 B2
(45) Date of Patent: Apr. 2, 2019

(54) OPERATION DISPLAY DEVICE, IMAGE PROCESSING APPARATUS, NON-TRANSITORY COMPUTER-READABLE RECORDING MEDIUM AND OPERATION DISPLAY METHOD

(71) Applicant: Konica Minolta, Inc., Chiyoda-ku (JP)

(72) Inventor: Yasuaki Sugimoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 301 days.

(21) Appl. No.: 14/496,197

(22) Filed: Sep. 25, 2014

(65) Prior Publication Data
US 2015/0095848 A1 Apr. 2, 2015

(30) Foreign Application Priority Data

Sep. 27, 2013 (JP) ................................. 2013-200913

(51) Int. Cl.
*G06F 3/0485* (2013.01)
*G06F 3/0482* (2013.01)
(Continued)

(52) U.S. Cl.
CPC .......... *G06F 3/0485* (2013.01); *G06F 3/0482* (2013.01); *H04N 1/00411* (2013.01);
(Continued)

(58) Field of Classification Search
None
See application file for complete search history.

(56) References Cited

U.S. PATENT DOCUMENTS

| 6,037,877 | A | * | 3/2000 | Matthews | ............ | H01H 9/0235 340/12.22 |
| 2008/0038032 | A1 | | 2/2008 | Suzue | | |

(Continued)

FOREIGN PATENT DOCUMENTS

| JP | 2006243952 | 9/2006 |
| JP | 2008044158 | 2/2008 |

(Continued)

OTHER PUBLICATIONS

Office Action (Decision of Refusal) dated Jan. 12, 2016, by the Japanese Patent Office in corresponding Japanese Patent Application No. 2013-200913 and an English translation of the Office Action. (9 pages).

(Continued)

*Primary Examiner* — Justin S Lee
*Assistant Examiner* — John M Heffington
(74) *Attorney, Agent, or Firm* — Buchanan Ingersoll & Rooney PC

(57) ABSTRACT

Disclosed is an operation display device including: a display unit to display a group of operation input items among a plurality of operation input items which are arranged in an arrangement order; an operating unit to receive a moving instruction operation for moving a position of the group of operation input items in accordance with the arrangement order, and to receive a setting operation for the operation input item; and a control unit to instruct the display unit to move the position of the group of operation input items so as to shorten a first display time for displaying one or more operation input items having a prohibition relation with the operation input item which has been set as compared with a second display time for displaying each of the other operation input items, in case that the operating unit receives the moving instruction operation.

18 Claims, 15 Drawing Sheets

(51) Int. Cl.
 *H04N 1/00* (2006.01)
 *G06F 3/0484* (2013.01)
 *G06F 3/0481* (2013.01)

(52) U.S. Cl.
 CPC .......... *G06F 3/0481* (2013.01); *G06F 3/0484* (2013.01); *G06F 2203/04808* (2013.01); *H04N 1/00453* (2013.01); *H04N 1/00458* (2013.01)

(56) References Cited

U.S. PATENT DOCUMENTS

| | | | |
|---|---|---|---|
| 2008/0155461 | A1 | 6/2008 | Ozaki |
| 2009/0178005 | A1* | 7/2009 | Jheng .................. G06F 3/0482 715/825 |
| 2011/0231800 | A1* | 9/2011 | Tomita .................. G06F 3/0482 715/835 |
| 2011/0317192 | A1 | 12/2011 | Fukuoka et al. |
| 2012/0054606 | A1* | 3/2012 | Terayoko .................. G09G 5/34 715/273 |
| 2012/0096395 | A1* | 4/2012 | Ording .................. G06F 9/4443 715/790 |
| 2012/0272179 | A1 | 10/2012 | Stafford |
| 2013/0222305 | A1* | 8/2013 | Kanno .................. G06F 3/0484 345/173 |
| 2014/0047560 | A1* | 2/2014 | Meyer .................. G06F 21/62 726/28 |
| 2014/0059129 | A1* | 2/2014 | Chumbley ........ G06F 17/30876 709/204 |
| 2014/0152585 | A1* | 6/2014 | Andersson Reimer ...................... G06F 3/04883 345/173 |
| 2016/0055196 | A1* | 2/2016 | Collins ............... G06F 17/2211 707/690 |

FOREIGN PATENT DOCUMENTS

| | | |
|---|---|---|
| JP | 2008157974 | 7/2008 |
| JP | 2011-113132 A | 6/2011 |
| JP | 2012-6263 A | 1/2012 |
| JP | 2012006263 | 1/2012 |
| JP | 2012148552 | 8/2012 |
| JP | 5161359 B1 | 3/2013 |
| JP | 2013-109528 A | 6/2013 |
| WO | 2012145180 | 10/2012 |

OTHER PUBLICATIONS

Notice of Reason for Refusal issued in corresponding Japanese Patent Application No. 2012-200913, dated Aug. 18, 2015, with English translation (15 pages).

* cited by examiner

OPERATION DISPLAY DEVICE, IMAGE PROCESSING APPARATUS, NON-TRANSITORY COMPUTER-READABLE RECORDING MEDIUM AND OPERATION DISPLAY METHOD

BACKGROUND OF THE INVENTION

Field of the Invention

The present invention relates to an operation display device, an image processing apparatus, a non-transitory computer-readable recording medium and an operation display method, for displaying a group of setting items among a plurality of setting items which are arranged in the arrangement order which is previously defined and for moving the position of the displayed group by scrolling or changing the window.

Description of Related Art

Conventionally, in an image forming apparatus, such as a printing machine, a multi-function peripheral having a print function, a scan function, a copy function and a facsimile function, and the like, the setting, such as the print setting, is carried out by using an operation panel or the like, which is provided in the main body of the image forming apparatus.

The setting, such as the print setting, is carried out by a plurality of setting operations. When a plurality of setting operations are received from a user, in case that the items which are prohibited from being set so as to combine them are set each other, that is, in case that the items having the prohibition relation are set each other, the image forming apparatus stops receiving the setting operations or prohibits the start of the printing. The prohibition relation is the combination of the functions which can be executed separately, however, which cannot be executed in combination in the image forming apparatus or the like.

The setting in which the items having the prohibition relation are combined is referred to as the prohibited setting. For example, when the item A and the item B having the prohibition relation are set in combination, the prohibited setting is caused.

As a technology for the prohibited setting, for example, in Japanese Patent Application Publication No. 2012-006263, the following technology is disclosed. In an image forming apparatus for displaying the setting item buttons indicating the functions of the image forming apparatus by scrolling the window, in case that one setting item is set, the scroll display is executed by setting the scroll speed at which each button of the setting items having the prohibition relation with the set setting item is displayed, so as to be lower than the scroll speed at which each button of the other setting items is displayed, and a user is reminded that the prohibited setting is caused when the setting item having the prohibition relation is set.

In recent years, multi-function peripherals have been more multi-functionalized and have many setting items to be set by the setting operations. However, because the size of the operation panel (display unit) is limited, it is difficult to display all of the setting items (setting item buttons) at once so as to be visually recognized by a user. Therefore, in general, a multi-function peripheral displays each setting item by displaying a group of setting items among a plurality of setting items and by moving the position of the displayed group, and receives the setting operations for one or more displayed setting items. For example, a method for moving the position of the displayed group includes a method for displaying the setting items and the like which are not within the screen of the display unit, by sliding the window in the right and left direction or in the upper and lower direction, that is, a so-called scroll display, a window change, and the like.

However, when the scroll display or the window change is carried out, not only the setting items necessary for a user but also the unnecessary setting items are displayed on the display unit. In case that there are many unnecessary setting items, it is troublesome to find the necessary setting item and carry out the setting operation, and the burden of the setting operation is given to a user. Therefore, it is desirable to remove the above troublesome task.

In the invention disclosed in Japanese Patent Application Publication No. 2012-006263, by lengthening the display time for displaying the setting item having the prohibition relation with the setting item which has been set, a user is reminded that the prohibited setting is caused when the setting item having the prohibition relation is set. Therefore, Japanese Patent Application Publication No. 2012-006263 does not solve the above problem.

SUMMARY

To achieve at least one of the abovementioned objects, an operation display device reflecting one aspect of the present invention comprises:

a display unit configured to display a group of operation input items among a plurality of operation input items which are arranged in an arrangement order which is previously defined;

an operating unit configured to receive a moving instruction operation for moving a position of the group of operation input items in a moving direction in accordance with the arrangement order, and to receive a setting operation for the operation input item; and a control unit configured to instruct the display unit to move the position of the group of operation input items so as to shorten a first display time for displaying one or more operation input items having a prohibition relation with the operation input item which has been set by receiving the setting operation as compared with a second display time for displaying each of the other operation input items, in case that the operating unit receives the moving instruction operation.

Preferably, the control unit shortens the first display time by not displaying the operation input items having the prohibition relation with the operation input item which has been set.

Preferably, the control unit instructs the display unit not to display the operation input items having the prohibition relation with the operation input item which has been set, by skipping the operation input items having the prohibition relation, or by deleting the operation input items having the prohibition relation, with a surrounding display area of the operation input items to be deleted.

Preferably, the plurality of operation input items are arranged so as to form a plurality of columns each of which includes two or more operation input items and each of which extends in a direction perpendicular to the moving direction, and so as to arrange the plurality of columns along the moving direction, and wherein in case that only the operation input items having the prohibition relation with the operation input item which has been set are arranged in one column with one operation input item having the prohibition relation, when the position of the group of operation input items is moved, the control unit shortens the first display time for displaying the one operation input item having the prohibition relation as compared with the second display time for displaying each of the other operation input items.

Preferably, the control unit instructs the display unit to move the position of the group of operation input items by scrolling the operation input items, and shortens the first display time by scrolling the operation input items having the prohibition relation with the operation input item which has been set, at a second speed which is higher than a first speed at which the other operation input items are scrolled.

Preferably, the operation display device further comprises a detection unit configured to detect a user's gaze, wherein in case that the detection unit does not detect the user's gaze which directs to the display unit when the operation input items are scrolled, the control unit instructs the display unit to scroll the operation input items having the prohibition relation with the operation input item which has been set, at a third speed which is higher than the second speed.

Preferably, the plurality of operation input items are arranged so as to be divided into a plurality of windows, the group of operation input items are displayed by displaying one of the plurality of windows, the position of the group of operation input items is moved by changing one window to another window; and when the position of the group of operation input items is moved, the control unit shortens the first display time for displaying each of only the windows in which all of the arranged operation input items have the prohibition relation with the operation input item which has been set, as compared with the second display time for displaying each of the other windows.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENTS

Hereinafter, preferred embodiments of the present invention will be explained with reference to the accompanying drawings.

First Embodiment

Figure 1:
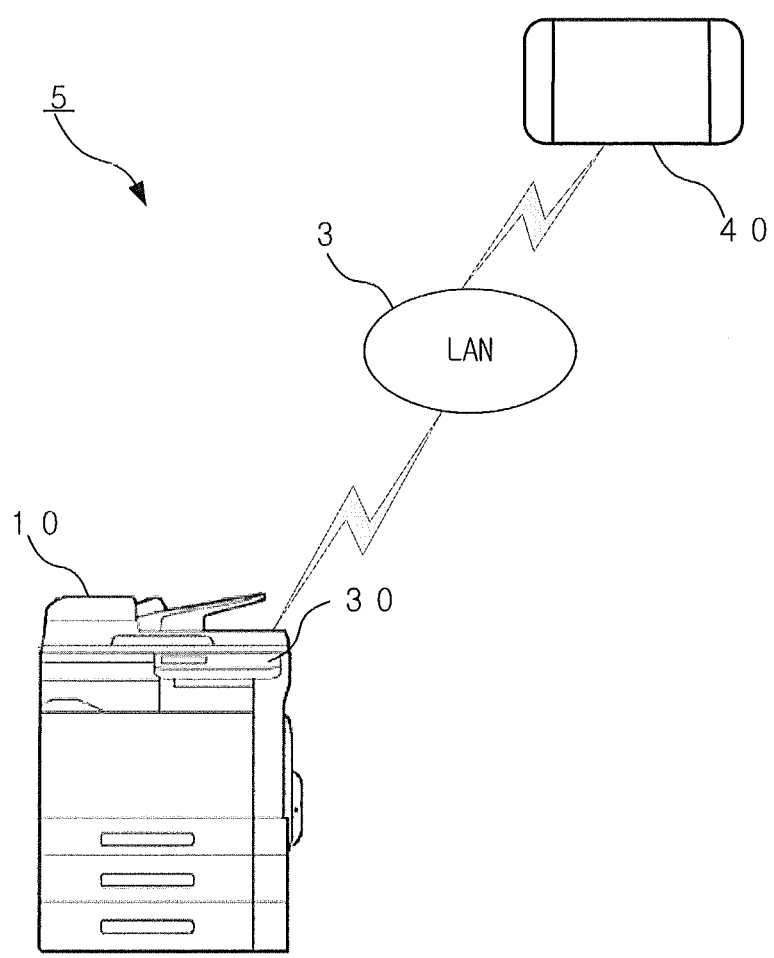
FIG. 1 is an explanation view showing the image forming apparatus and the portable terminal according to the embodiments.

FIG. 1 shows the printing system 5 according to the first embodiment. The printing system 5 comprises an image forming apparatus 10 having the function as the image processing apparatus according to the first embodiment, and a portable terminal 40 having the function as the operation display device according to the first embodiment, which are connected via a LAN (Local Area Network) 3.

The image forming apparatus 10 is a so-called multi-function peripheral having the function for executing jobs, such as a copy job for printing an image on recording paper by optically reading an original, a scan job for obtaining image data by reading an original to store the image data as a file or to transmit the image data to an external terminal via a network, a print job for printing out an image by forming the image on the recording paper in accordance with the print data received from a PC or the like, and the like. The image forming apparatus 10 comprises an operation panel 30 having a display unit 31 and an operating unit 32, and receives the setting operations for inputting various types of settings or jobs from a user via the operation panel 30 (See FIG. 2).

Figure 3:
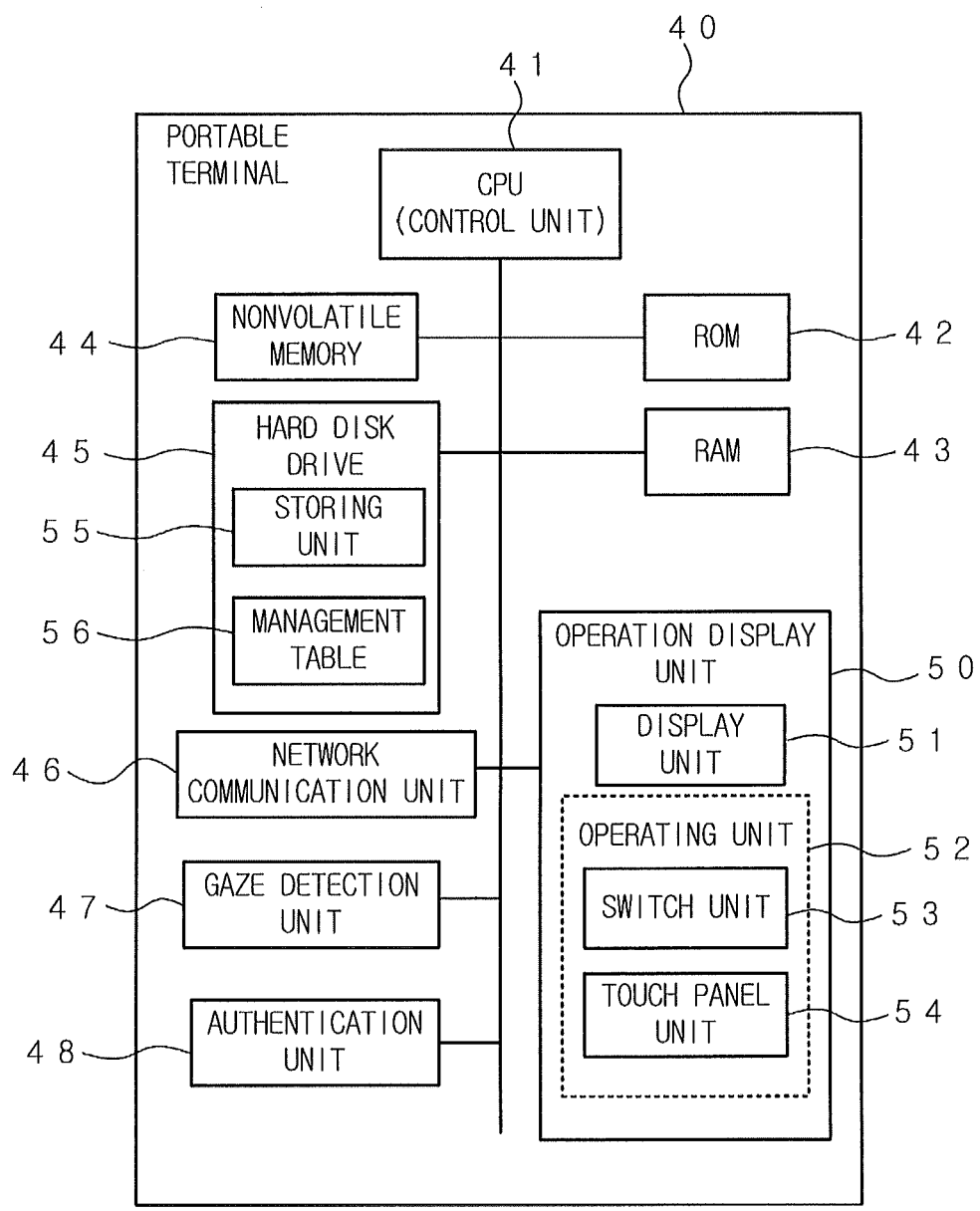
FIG. 3 is a block diagram showing the schematic configuration of the portable terminal according to the embodiments.

The portable terminal 40 is a hand-portable terminal, and comprises an operation display unit 50 having a display unit 51 and an operating unit 52 (See FIG. 3). The portable terminal 40 receives the setting operation for preparing a print job from a user. When the portable terminal 40 prepares a print job, the portable terminal 40 transmits the print job to the image forming apparatus 10.

When each of the portable terminal 40 and the operation panel 30 receives the setting operation from a user, each of the portable terminal 40 and the operation panel 30 displays the operation input item (the button of the operation input item) to be set in accordance with the received setting operation. However, there are a plurality of operation input items to be set. As a result, it is difficult for the display unit 31 or 51 to display all of the operation input items at once at the size that a user can visually recognize the operation input items. Therefore, each of the portable terminal 40 and the operation panel 30 displays a group of setting items among a plurality of operation input items, and displays each operation input item by moving the position of the displayed group. Further, each of the portable terminal 40 and the operation panel 30 receives the setting operation for the displayed operation input item.

The arrangement order of a plurality of operation input items is previously defined. As a method for moving the position of the displayed group, the method for displaying the operation input items and the like which are not within the screen of the display unit, by sliding the window in the right and left direction or in the upper and lower direction, that is, the scroll display is adopted. For example, each of the portable terminal 40 and the operation panel 30 arranges a plurality of operation input items on the window which is laterally elongated and displays a part of the window. Then, by moving the position of the displayed part, each of the portable terminal 40 and the operation panel 30 displays each operation input item and receives the setting operation for the displayed operation input item (See FIG. 5).

In a plurality of operation input items, there are operation input items which are prohibited from being set so as to combine them, that is, operation input items having the prohibition relation. The prohibition relation is the combination of the functions which can be executed separately, however, which cannot be executed in combination. The setting in which the operation input items having the prohibition relation are combined is referred to as the prohibited setting. For example, when the operation input item A and the operation input item B having the prohibition relation are set in combination, the prohibited setting is caused. In case that the prohibited setting is caused, each of the portable terminal 40 and the image forming apparatus 10 stops the setting operation.

In this embodiment, each of the portable terminal 40 and the image forming apparatus 10 shortens the display time for displaying the operation input item having the prohibition relation with the operation input item which has been set by receiving the setting operation from a user, as compared with the display time for displaying the other operation input items, in the scroll display.

In the first embodiment, the operation input items having the prohibition relation with the operation input item which has been set by receiving the setting operation from a user, are skipped or are deleted with the surrounding display area of the operation input items to be deleted. That is, in case that the scroll display is carried out, the operation input items having the prohibition relation with the operation input item which has been set are not displayed and only the other operation input items are displayed. Therefore, in the scroll display, the time which elapses before the operation input item to be displayed after the operation input item having the prohibition relation with the operation input item which has been set is displayed, can be shortened.

Figure 2:
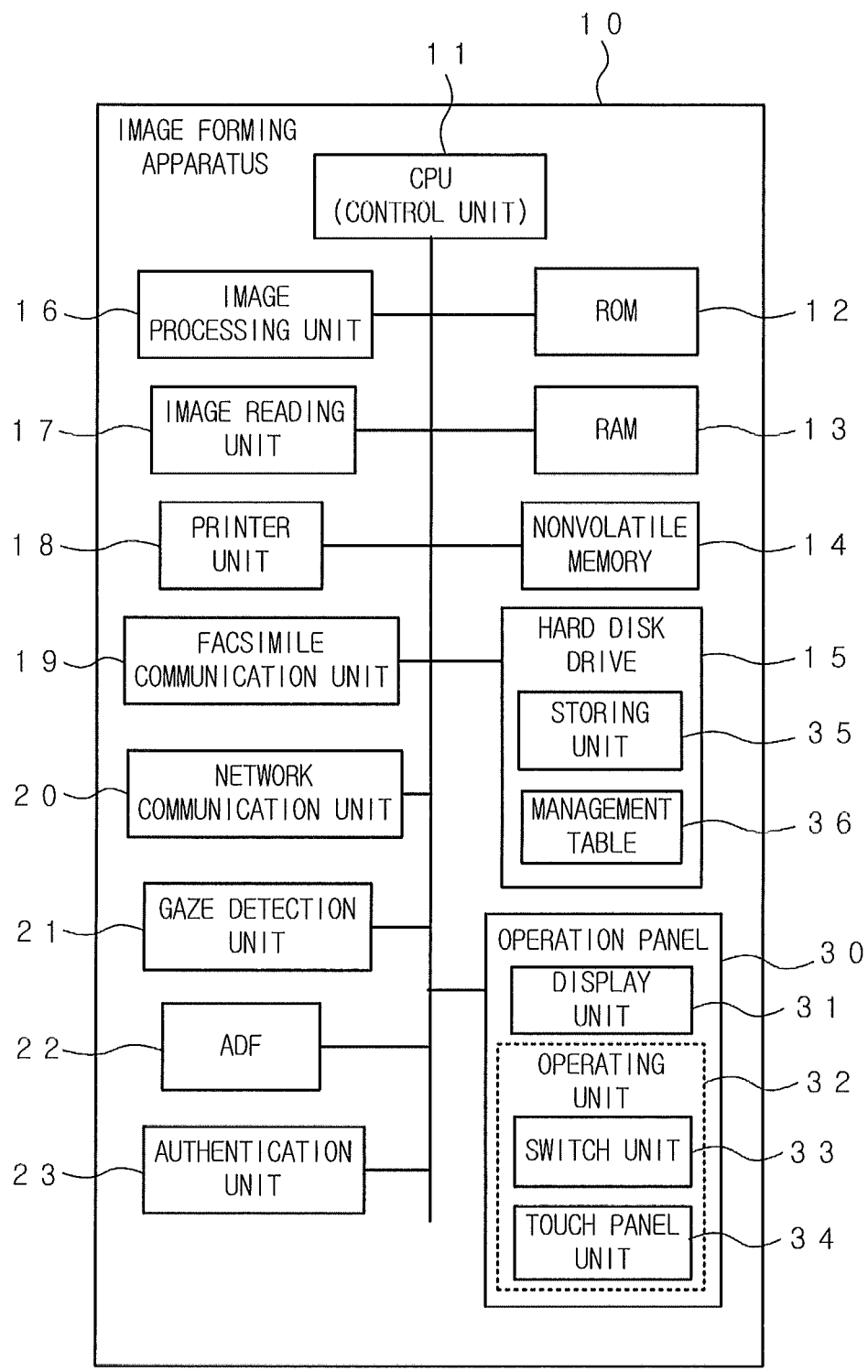
FIG. 2 is a block diagram showing the schematic configuration of the image forming apparatus according to the embodiments.

FIG. 2 is a block diagram showing the schematic configuration of the image forming apparatus 10 according to the embodiments. The image forming apparatus 10 comprises a CPU (Central Processing Unit) 11 for entirely controlling the operation of the image forming apparatus 10. The CPU 11 is connected with a ROM (Read Only Memory) 12, a RAM (Random Access Memory) 13, a nonvolatile memory 14, a hard disk drive 15, an image processing unit 16, an image reading unit 17, a printer unit 18, a facsimile communication unit 19, a network communication unit 20, a gaze detection unit 21, an ADF (Auto Document Feeder) 22, an authentication unit 23 and the operation panel 30 via a bus.

By the CPU 11, a middleware, application programs and the like are executed on an OS (Operating System) program as a base. Further, the CPU 11 functions as the control unit for controlling the display contents of the operation panel 30.

In the ROM 12, various types of programs are stored. By executing various types of processes by the CPU 11 in accordance with these programs, each function of the image forming apparatus 10 is realized. Further, in the ROM 12, the program for executing a series of the control of the image forming apparatus 10 by the CPU 11, is stored.

The RAM 13 is used as a work memory for temporarily storing various types of data when the CPU 11 executes the process in accordance with the programs, and as an image memory for storing image data, and the like.

The nonvolatile memory 14 is a memory (flash memory) in which the stored contents are not damaged even if the image forming apparatus 10 is turned off, and is used for storing various setting information, and the like.

The hard disk drive 15 is a large-capacity nonvolatile storing device. The OS program, various types of application programs, user information, print data, image data, job history data and the like are stored in the storing unit 35. In the embodiment, in the storing unit 35, the prohibition table which is the table of the combination of the operation input items, which causes the prohibited setting, is stored.

Further, in the embodiment, in the hard disk drive 15, the management table 36 for registering the speed at which each operation input item passes through the display unit 31 in the scroll display, is stored.

The image processing unit 16 carries out the rasterization processing for converting print data into image data, the compression/decompression processing for image data and the like, in addition to the processings, such as enlargement/reduction and rotation of the image.

The image reading unit 17 has a function for optionally reading an original to obtain the image data. For example, the image reading unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 18 has a function for forming an image on the recording paper in accordance with the image data. In this embodiment, the printer unit 18 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 19 has a function for transmitting and receiving the image data to/from an external device having the facsimile function via a telephone line.

The network communication unit 20 has a function for communicating data with the portable terminal 40 or other external devices via a network, such as LAN or the like. In the cooperation panel mode, the network communication unit 20 transmits the display data for displaying the window which is cooperated with the window displayed on the operation panel 30, to the portable terminal 40.

The gaze detection unit 21 detects the gaze of the user who operates the operation panel 30. The gaze detecting method may be an optional method. For example, a detecting camera is provided at the middle portion of the upper edge of the operation panel 30, and the image obtained by the detecting camera is analyzed to detect the user's gaze from the direction of the user's face, the position of the pupil in the user's eye, and the like. The image forming apparatus 10 recognizes whether the user views the display unit 31 of the operation panel 30 by detecting the user's gaze with the gaze detection unit 21.

The ADF 22 has a function as an auto document feeder for successively feeding the original having a plurality of sheets to the reading position of the image reading unit 17 when the images of the original are read. It is possible to set the original having about 30 sheets at once, and to omit the task for resetting the original to the original setting tray every when the original is read.

The authentication unit 23 carries out the user authentication. Specifically, when the user is logged in, the authentication unit 23 carries out the user authentication and identifies the login user. In the embodiment, in order to use the image forming apparatus 10, the login is required. Before using the image forming apparatus 10, the user authentication is necessarily carried out. The method for carrying out the user authentication may be an optional suitable method, such as the authentication using the user ID (Identification) and the password, fingerprint authentication or the like.

The operation panel 30 comprises the display unit 31 and the operating unit 32. The operating unit 32 comprises a switch unit 33, such as a start button, a return button and the like, and a touch panel unit 34. The display unit 31 comprises a liquid crystal display (LCD) and the like, and has a function for displaying various types of operation windows, setting windows and the like. In this embodiment, the CPU 11 controls the display contents to be displayed on the operation panel 30 and the reception of the operation via the operation panel 30.

The touch panel unit 34 is provided on the display unit 31. The touch panel unit 34 detects the touch position (coordinate position) on which the display screen of the display unit 31 is pressed down by a touch pen, the user's finger or the like. The CPU 11 recognizes the flick operation, the drag operation or the like in accordance with the change in the touch position which is continuously detected (operation information).

FIG. 3 is a block diagram showing the schematic configuration of the portable terminal 40. The portable terminal 40 comprises a CPU 41 for entirely controlling the operation of the portable terminal 40. The CPU 41 is connected with a ROM 42, a RAM 43, a nonvolatile memory 44, a hard disk drive 45, a network communication unit 46, a gaze detection unit 47, an authentication unit 48 and an operation display unit 50 via a bus.

By the CPU 41, a middleware, application programs and the like are executed on an OS program as a base. Further, the CPU 41 functions as the control unit for controlling the display contents of the operation display unit 50.

In the ROM 42, various types of programs are stored. By executing various types of processes by the CPU 41 in accordance with these programs, each function of the portable terminal 40 is realized. Further, in the ROM 42, the program for executing a series of the control of the portable terminal 40 by the CPU 41, is stored.

The RAM 43 is used as a work memory for temporarily storing various types of data when the CPU 41 executes the process in accordance with the programs, and the like.

The nonvolatile memory 44 is a memory (flash memory) in which the stored contents are not damaged even if the portable terminal 40 is turned off, and is used for storing various setting information, and the like.

The hard disk drive 45 is a large-capacity nonvolatile storing device. The OS program, various types of application programs and the like are stored in the storing unit 55. In the embodiment, in the storing unit 55, the prohibition table which is the table of the combination of the operation input items having the prohibition relation, is stored.

Further, in the embodiment, in the hard disk drive 45, the management table 56 for registering the speed at which each operation input item passes through the display unit 51 in the scroll display, is stored.

The network communication unit 46 has a function for communicating data with the image forming apparatus 10 or other external devices via a network, such as the LAN 3 or the like.

The gaze detection unit 47 detects the gaze of the user who operates the operation display unit 50. The gaze detecting method may be an optional method. For example, a detecting camera is provided at the middle portion of the upper edge of the operation display unit 50, and the image obtained by the detecting camera is analyzed to detect the user's gaze from the direction of the user's face, the position of the pupil in the user's eye, and the like. The portable terminal 40 recognizes whether the user views the display unit 51 of the operation display unit 50 by detecting the user's gaze with the gaze detection unit 47.

The authentication unit 48 carries out the user authentication. Specifically, when the user is logged in, the authentication unit 48 carries out the user authentication and identifies the login user. In the embodiment, in order to use the portable terminal 40, the login is required. Before using the portable terminal 40, the user authentication is necessarily carried out. The method for carrying out the user authentication may be an optional suitable method, such as the authentication using the user ID and the password, fingerprint authentication or the like.

The operation display unit 50 comprises the display unit 51 and the operating unit 52. The operating unit 52 comprises a switch unit 53, such as a start button, a return button and the like, and a touch panel unit 54. The display unit 51 comprises a liquid crystal display and the like, and has a function for displaying various types of operation windows, setting windows and the like.

The touch panel unit 54 is provided on the display unit 51. The touch panel unit 54 detects the touch position (coordinate position) on which the display screen of the display unit 51 is pressed down by a touch pen, the user's finger or the like. The CPU 41 recognizes the flick operation, the drag operation, the multi-touch operation or the like in accordance with the change in the touch position which is continuously detected (operation information).

Basically, each of the portable terminal 40 and the image forming apparatus 10 carries out the same display control when the setting operation relating to the printing is received from a user. In the embodiment, by exemplifying the image forming apparatus 10, the display control which is carried out in case that the setting operation relating to the printing is received, will be explained.

Figure 4:
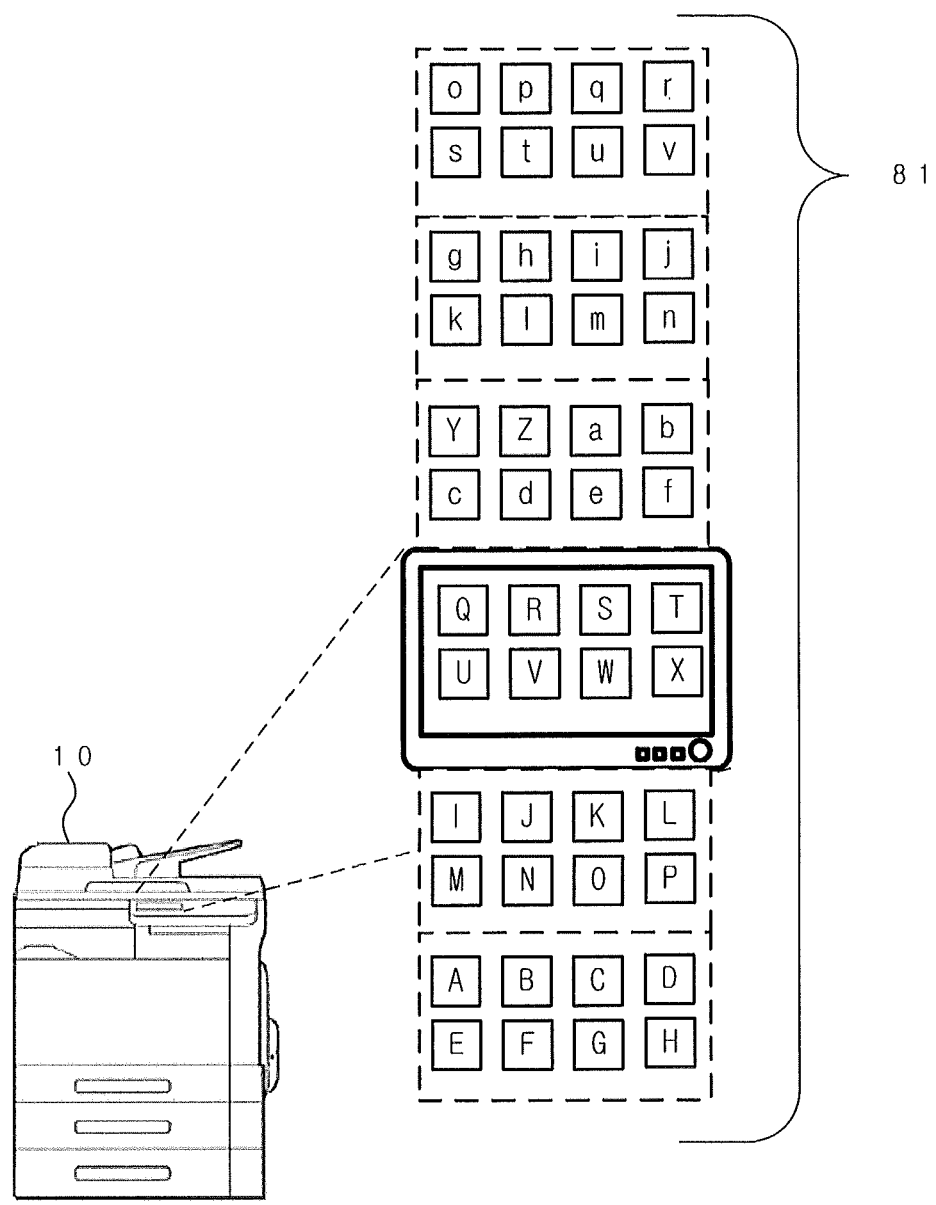
FIG. 4 is a view showing the window configuration incase that the window is scrolled in the upper and lower direction.
Figure 5:
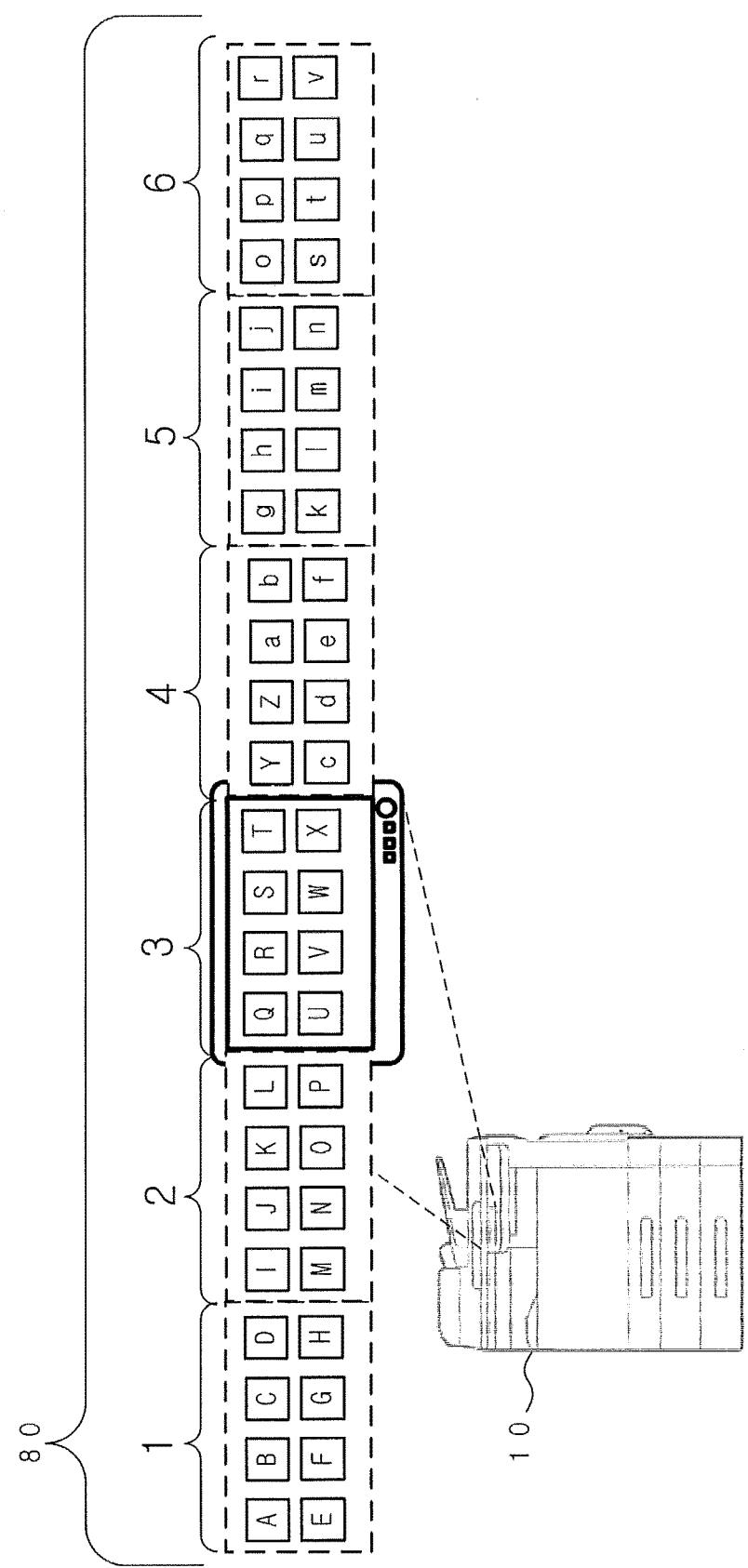
FIG. 5 is a view showing the window configuration incase that the window is scrolled in the right and left direction.

Each of FIG. 4 and FIG. 5 shows a plurality of operation input items to be displayed when the setting operation relating to the printing is received. The image forming apparatus 10 arranges the operation input items in the elongated window and displays a part of the elongated window. FIG. 4 shows an example in which the operation input items are arranged in the window which is longitudinally elongated. FIG. 5 shows an example in which the operation input items are arranged in the window which is laterally elongated.

In FIG. 4, the image forming apparatus 10 arranges the operation input items so as to form 12×4 matrix in the whole window 81 which is longitudinally elongated, and displays a part of the whole window 81 (the operation input items arranged within the area in which 2×4 matrix is formed). Each operation input item is displayed as an operation button (indicating the name of the function to be set) for receiving the setting operation. In FIG. 4, the position of the displayed part is moved in the upper and lower direction by scrolling the whole window 81 in the upper and lower direction.

In FIG. 5, the image forming apparatus 10 arranges the operation input items so as to form 2×24 matrix in the whole window 80 which is laterally elongated, and displays a part of the whole window 80 (the operation input items arranged within the area in which 2×4 matrix is formed). Each operation input item is displayed as an operation button (indicating the name of the function to be set) for receiving the setting operation. In FIG. 5, the position of the displayed part is moved in the right and left direction by scrolling the whole window 80 in the right and left direction.

As shown in FIG. 4 and FIG. 5, the elongated window may be elongated longitudinally or laterally. Hereinafter, by exemplifying the whole window 80 which is elongated laterally, the embodiment will be explained. The image forming apparatus 10 displays each operation input item by scrolling the whole window 80 in the right and left direction, and receives the setting operation. After receiving the setting operation, when the start button of the operation panel 30 is pressed down, the printing is started in accordance with the set contents.

In this embodiment, the case in which the whole window 80 is divided into 6 sections (first area to sixth area, in the drawings, the areas are denoted by 1 to 6, respectively), will be explained.

Figure 6:
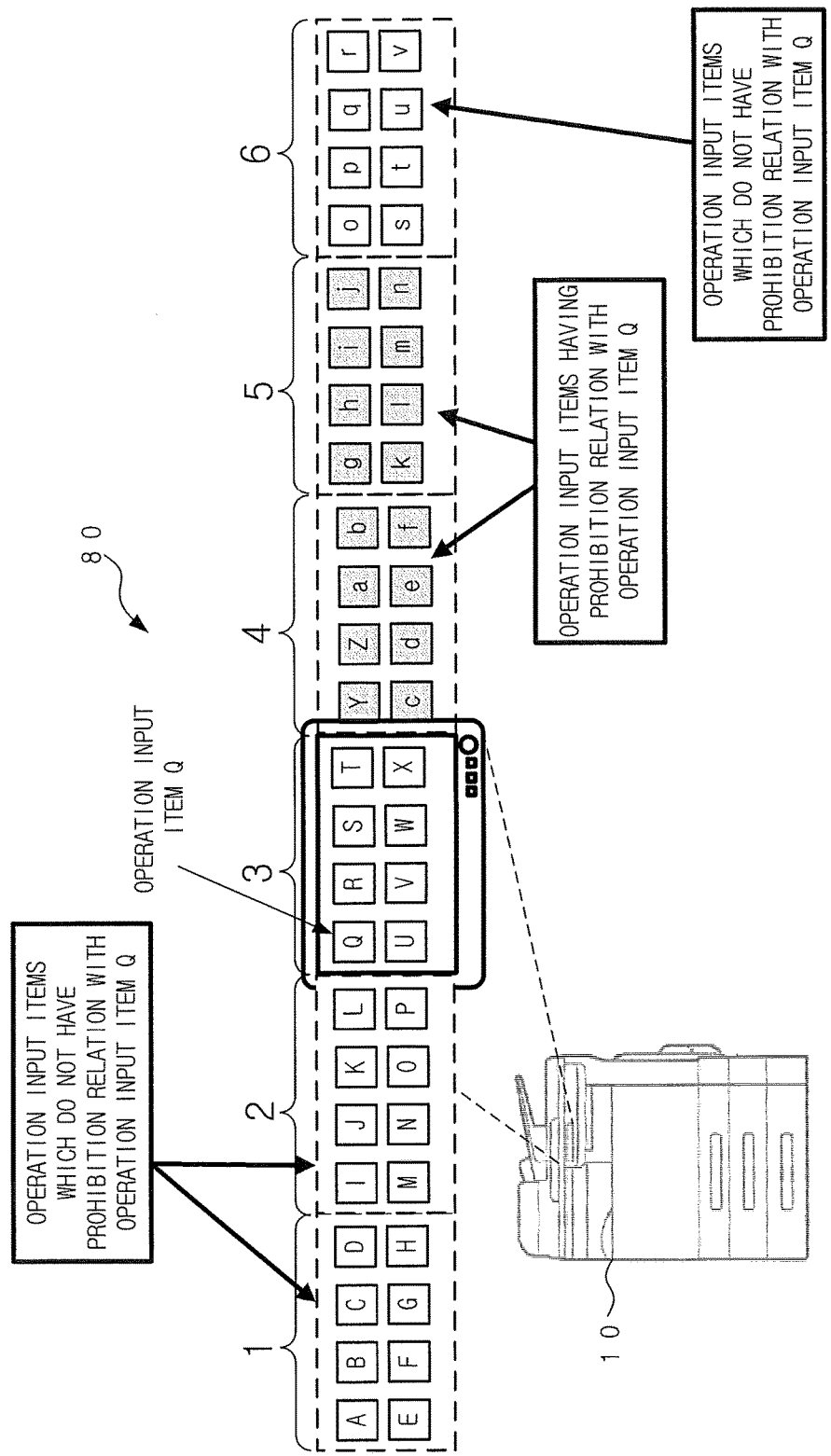
FIG. 6 is a view showing the operation input items having the prohibition relation with the operation input item Q.

FIG. 6 shows the operation input items having the prohibition relation with the operation input item Q which is arranged in the third area of the whole window 80. In each drawing, the operation input items having the prohibition relation with the operation input item Q are dimmed. In FIG. 6, all of the operation input items arranged in the fourth area and the fifth area are the operation input items having the prohibition relation with the operation input item Q. In case that the operation input item Q is set, the image forming apparatus 10 skips the operation input items arranged in the fourth area and the fifth area, or deletes the operation input items with the surrounding display area.

Figure 7:
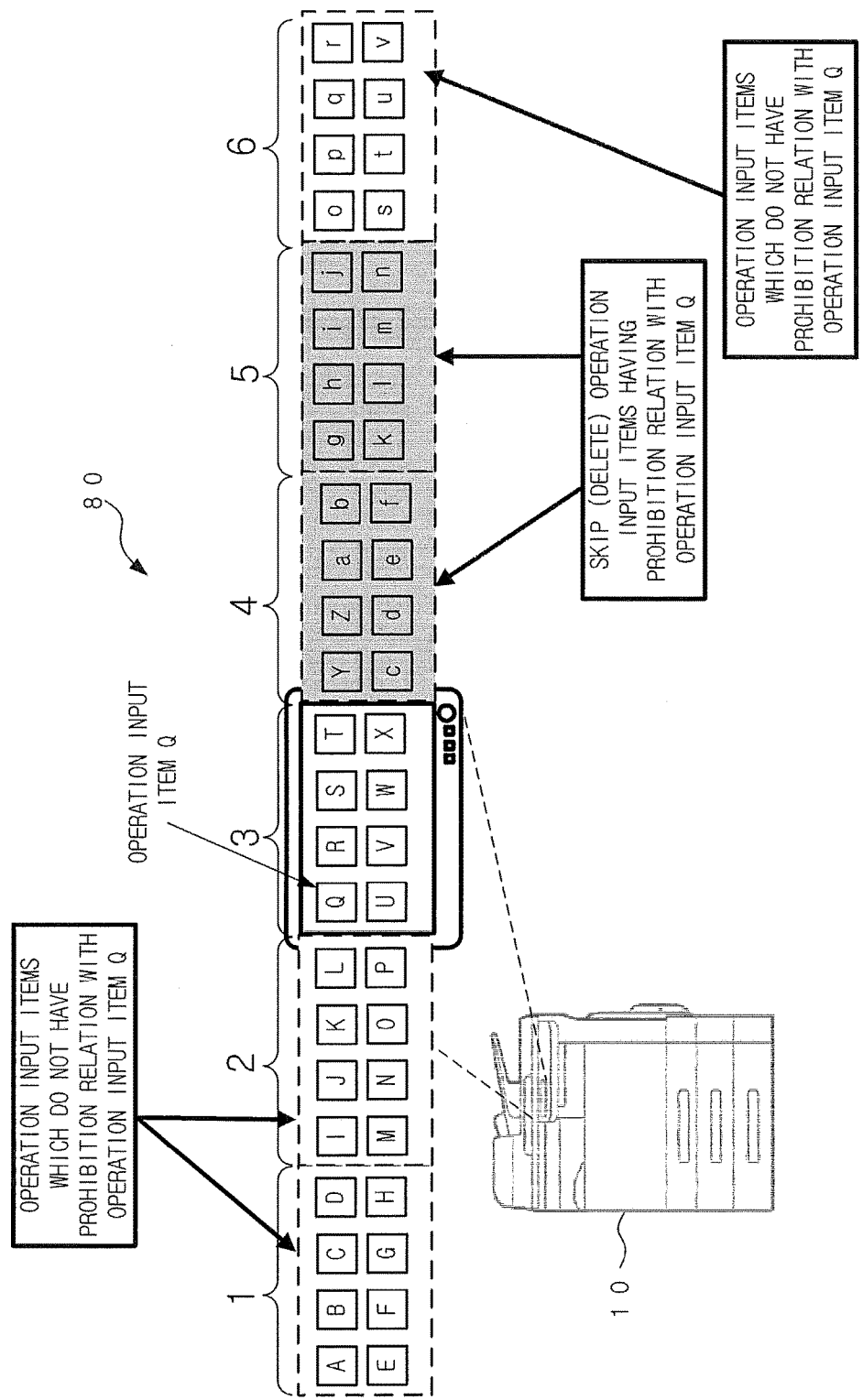
FIG. 7 is a view showing the operation input items to be omitted in case that the operation input item Q is set.

FIG. 7 shows that the part to be skipped or deleted with the surrounding display area in the whole window 80, is dimmed in case that the operation input item Q is set. In FIG. 7, the fourth area and the fifth area are the part to be skipped or deleted with the surrounding display area.

Figure 8:
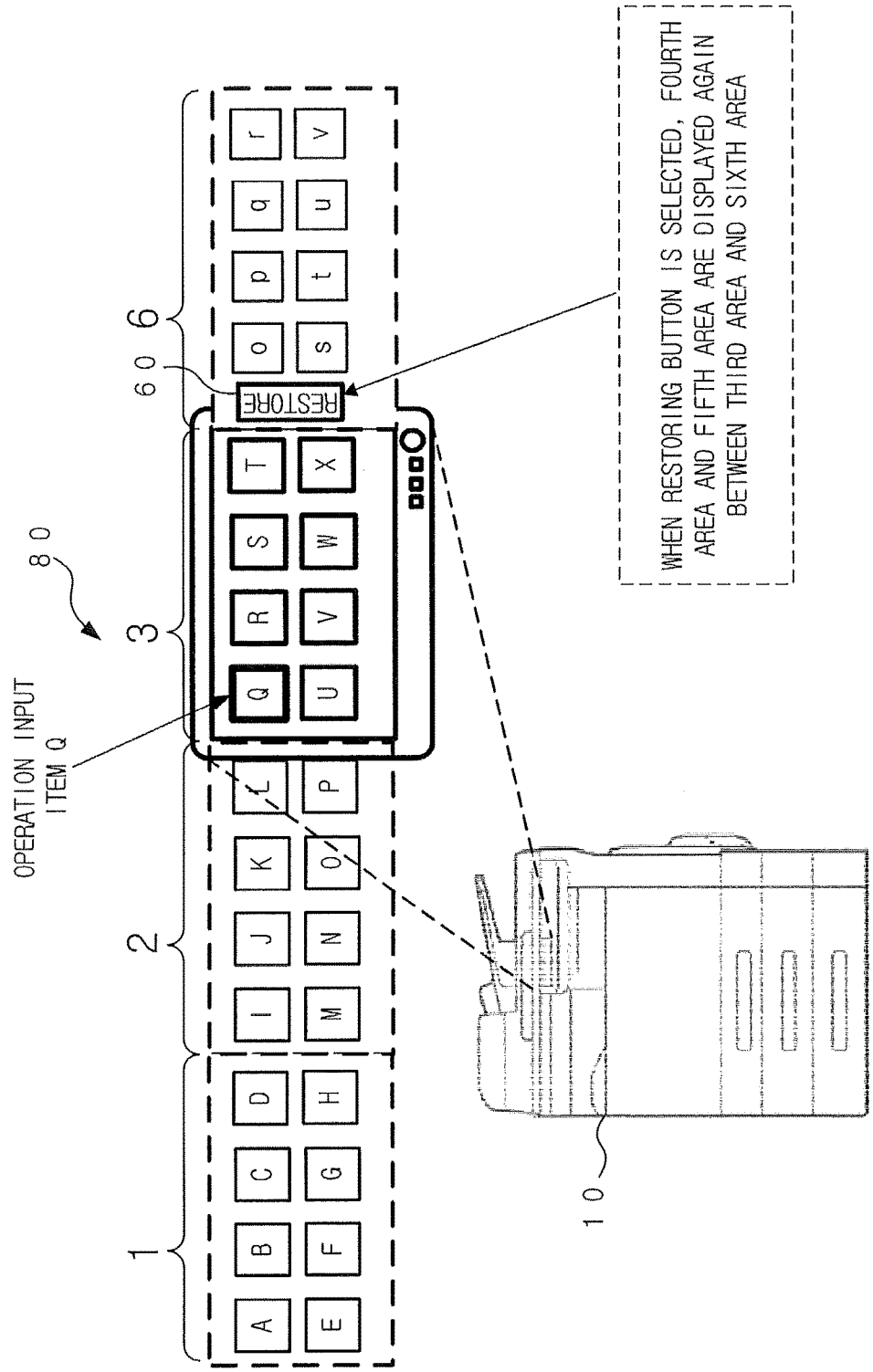
FIG. 8 is a view showing the situation in which the operation input items are omitted in case that the operation input item Q is set.

FIG. 8 shows the part of the whole window 80, which is displayed on the display unit 31 in case that the operation input items having the prohibition relation with the operation input item Q are skipped or deleted with the surrounding display area. The fourth area and the fifth area including the operation input items having the prohibition relation with the operation input item Q are skipped or are temporarily deleted, and only the first to the third areas and the sixth area are displayed. By scrolling the whole window 80 in the right direction, the sixth area is displayed next to the third area.

In case that the operation input item Q is set, because it is not necessary to receive the operation for the operation input items having the prohibition relation with the operation input item Q, it is not meaningful to display the above operation input items. Therefore, by skipping the operation input items having the prohibition relation with the operation input item Q or by deleting the above operation input items with the surrounding display area, it is possible to shorten the time which elapses before the operation input item to be displayed after the operation input items having the prohibition relation with the operation input item Q is displayed in the scroll display.

In FIG. 8, in the whole window 80, the restoring button 60 is displayed at the position of the skipped operation input items or the operation input items which are deleted with the surrounding display area (the operation input items arranged in the fourth area and the fifth area). When the image forming apparatus 10 receives the operation for the restoring button 60, the image forming apparatus 10 restores the skipped operation input items or the operation input items which are temporarily deleted (the fourth area and the fifth area) to display the restored operation input items.

A user previously executes the setting as to whether the operation input items having the prohibition relation with the operation input item which has been set are skipped or are deleted with the surrounding display area.

Figure 9:
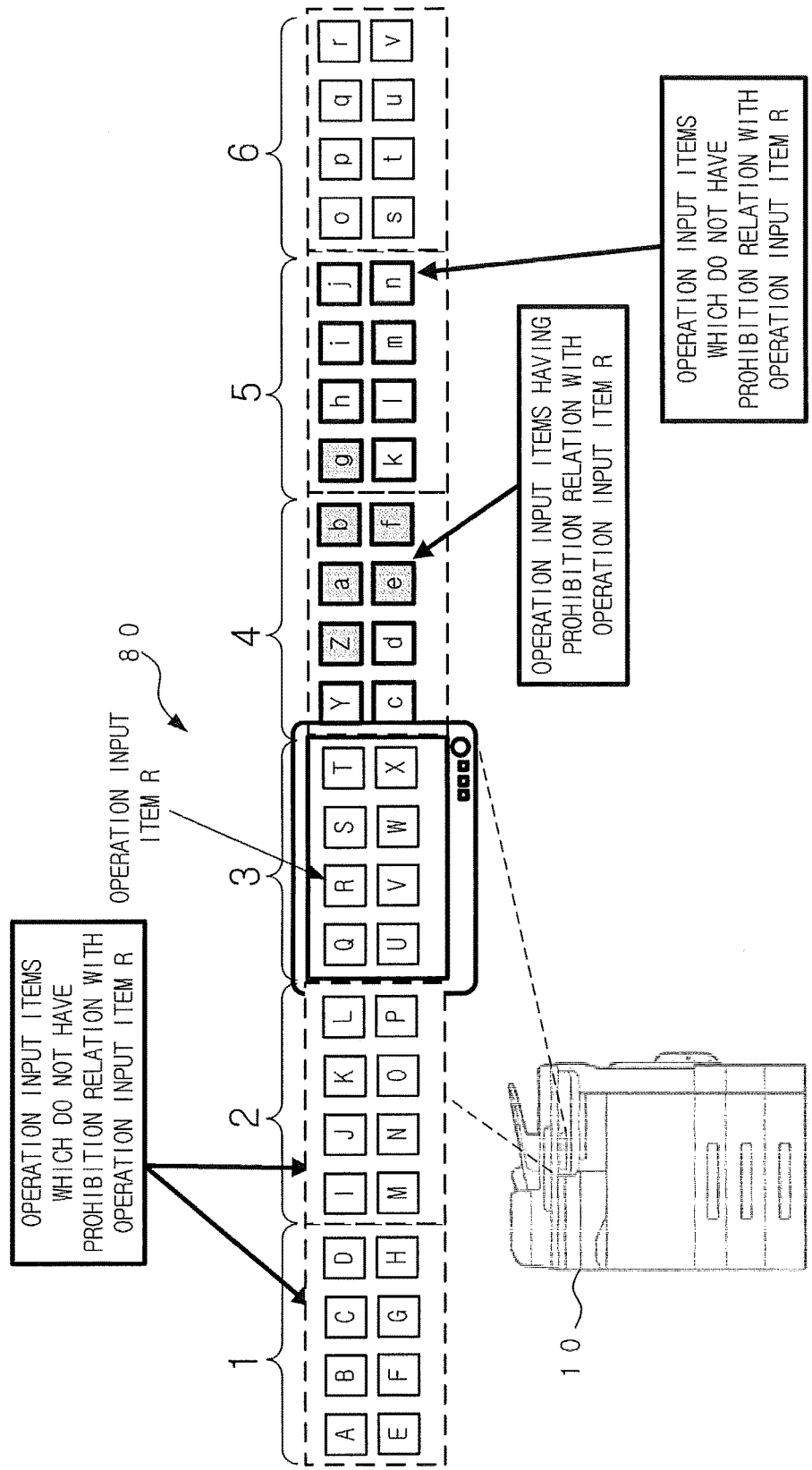
FIG. 9 is a view showing the operation input items having the prohibition relation with the operation input item R.
Figure 10:
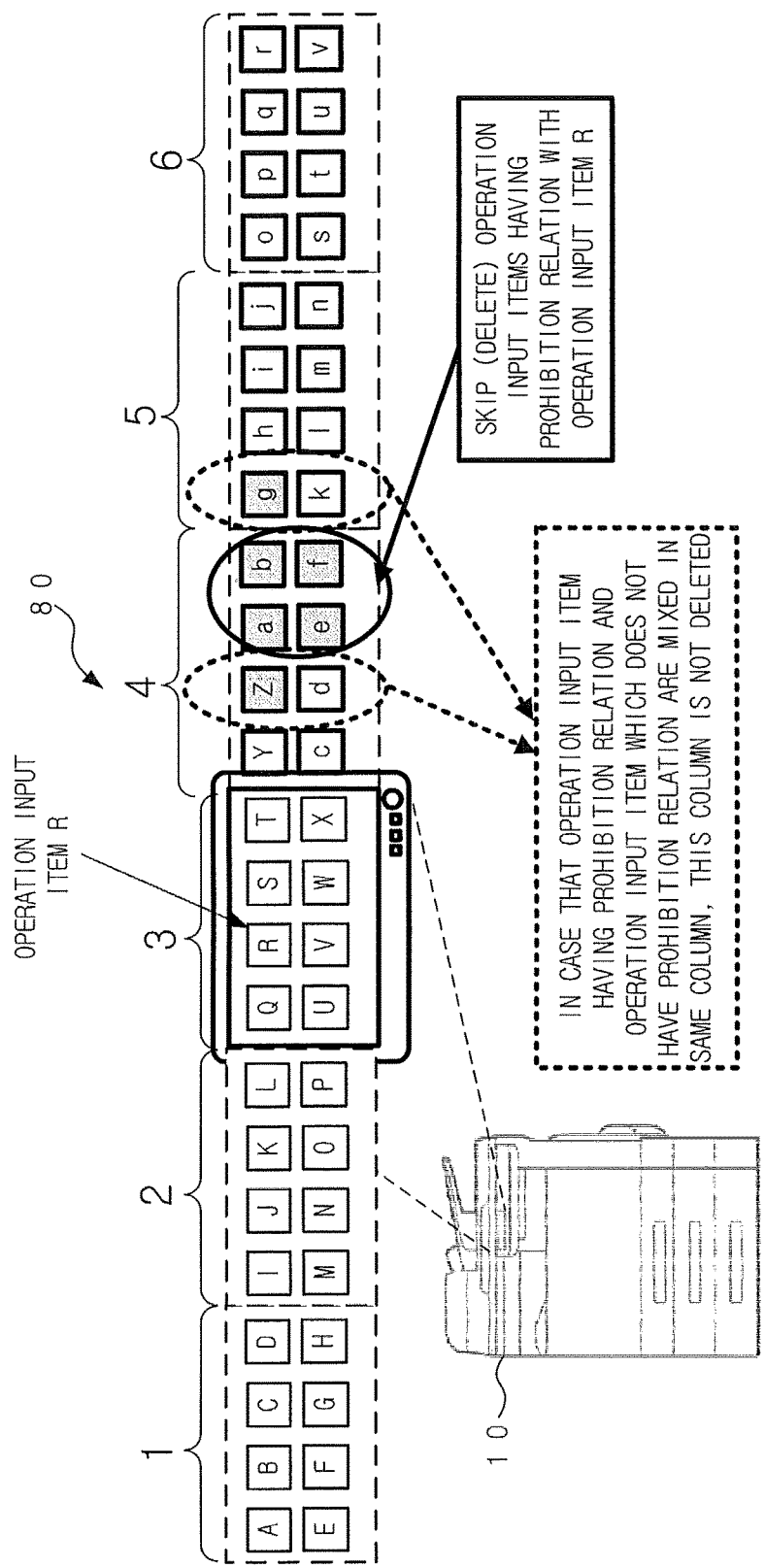
FIG. 10 is a view showing the columns of the operation input items to be omitted in case that the operation input item R is set.
Figure 11:
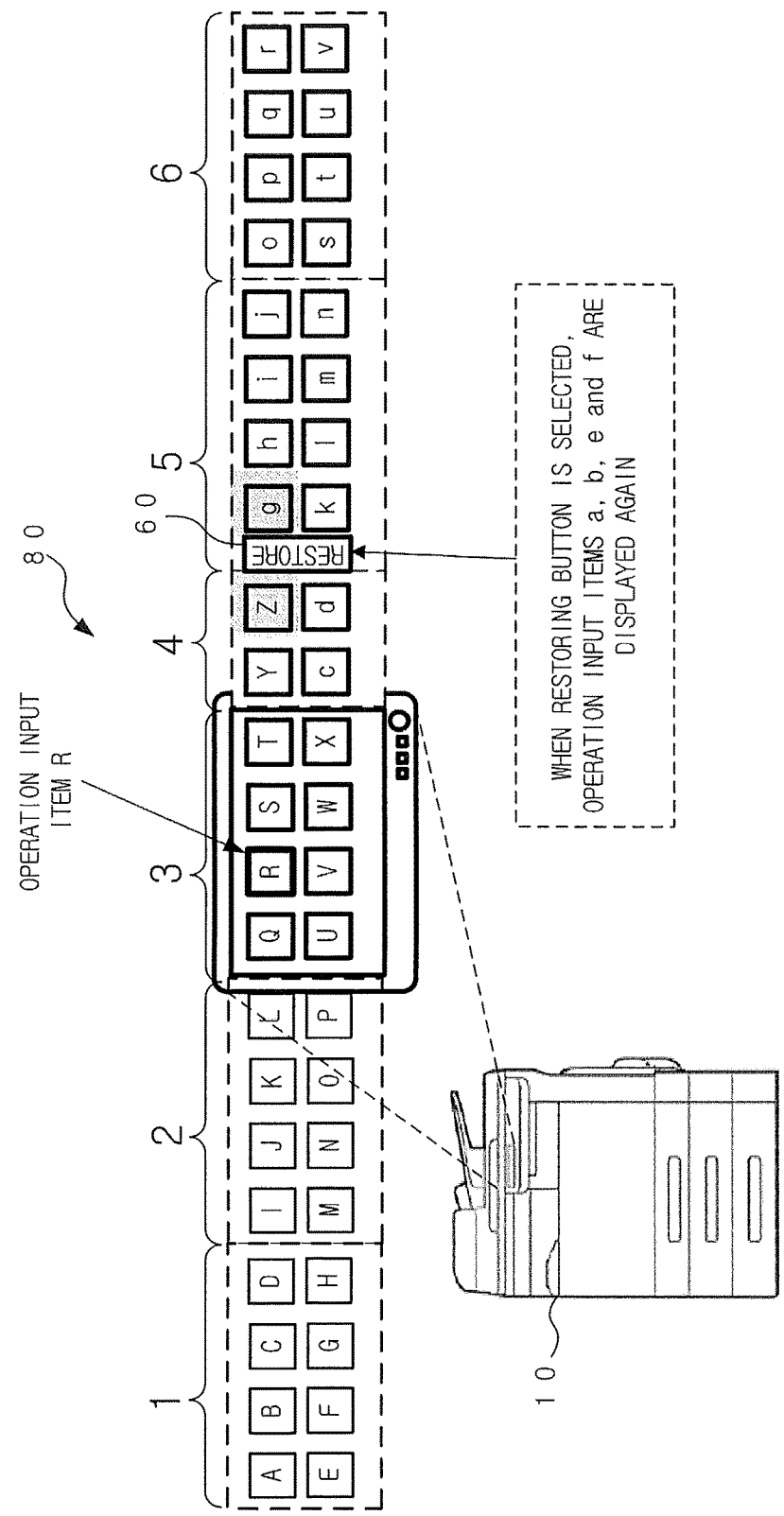
FIG. 11 is a view showing the situation in which the operation input items are omitted in case that the operation input item R is set.

In FIGS. 6 to 8, the operation input item which does not have the prohibition relation with the operation input item Q does not exist on the same line extending in the direction perpendicular to the scroll direction, with the operation input item having the prohibition relation with the operation input item Q. In FIGS. 9 to 11, the case in which the operation input item which does not have the prohibition relation with the operation input item R exists on the same line extending in the direction perpendicular to the scroll direction (hereinafter, referred to as "column"), with the operation input item having the prohibition relation with the operation input item R, will be explained. In FIGS. 9 to 11, the image forming apparatus 10 is set so as to skip the operation input items having the prohibition relation with the operation input item R.

FIG. 9 shows the operation input items having the prohibition relation with the operation input item R arranged in the third area. In the drawings, the operation input items having the prohibition relation with the operation input item R are dimmed. In FIG. 9, the operation input items Z, a, b, e and f arranged in the fourth area and the operation input item g arranged in the fifth area have the prohibition relation with the operation input item R.

The operation input items a and e are arranged in the same column. The operation input items b and f are arranged in the same column.

In the column in which the operation input item Z is arranged, the operation input item d which does not have the prohibition relation with the operation input item R is arranged. In the column in which the operation input item g is arranged, the operation input item k which does not have the prohibition relation with the operation input item R is arranged.

In case that the operation input item having the prohibition relation with the operation input item which has been set and the operation input item which does not have the prohibition relation with the operation input item which has been set, are mixed in the same column, the image forming apparatus 10 does not skip the operation input items arranged in the same column. That is, the whole of the above column is excluded from the operation input items to be skipped.

FIG. 10 shows the operation input items to be skipped and the operation input items which are not skipped, so as to be distinguished from each other among the operation input items having the prohibition relation with the operation input item R in case that the operation input item R is set. In the drawings, the operation input items having the prohibition relation with the operation input item R are dimmed.

In each of the column including the operation input items a and e and the column including the operation input items b and f (the part enclosed by the solid ellipse in FIG. 10), only the operation input items having the prohibition relation with the operation input item R are arranged. Therefore, the above columns are skipped.

In each of the column including the operation input items Z and d and the column including the operation input items g and k (the part enclosed by the dashed ellipse in FIG. 10), the operation input item having the prohibition relation with the operation input item R and the operation input item which does not the above prohibition relation are mixed. Therefore, the above columns are not skipped.

FIG. 11 shows the part of the whole window 80, which is displayed on the display unit 31 in case that the columns in which only the operation input items having the prohibition relation with the operation input item R are arranged are skipped.

The column including the operation input items a and e and the column including the operation input items b and f are skipped (with the background area). When the whole window 80 is scrolled in the right direction, the column including the operation input items g and k is displayed next to the column including the operation input items Z and d. The column including the operation input items a and e and the column including the operation input items b and f are skipped.

In case that the operation input item R is set, because it is not necessary to receive the operation for the operation input items having the prohibition relation with the operation input item R, it is not meaningful to display the above operation input items. Therefore, by skipping the operation input items having the prohibition relation with the operation input item R, it is possible to shorten the time which elapses before the operation input item to be displayed after the operation input item having the prohibition relation with the operation input item R is displayed in the scroll display. However, in case that in the column in which the operation input item having the prohibition relation with the operation input item R is arranged, the operation input item which does not have the above prohibition relation is arranged, because it is necessary to display the operation input item which does not have the above prohibition relation, the above column is not skipped.

In FIG. 11, in the whole window 80, the restoring button 60 is displayed at the position of the skipped columns (the column including the operation input items Z and d and the column including the operation input items g and k). When the image forming apparatus 10 receives the operation for the restoring button 60, the image forming apparatus 10 restores the skipped columns (the column including the operation input items Z and d and the column including the operation input items g and k) to display the restored columns.

As described above, in the first embodiment, the image forming apparatus 10 skips the operation input item having the prohibition relation with the operation input item which has been set, or deletes the above operation input item with the surrounding display area. Therefore, it is possible to shorten the time which elapses before the operation input item to be displayed after the operation input item having the prohibition relation is displayed in the scroll display.

Second Embodiment

In the first embodiment, in the scroll display, the operation input items having the prohibition relation with the operation input item which has been set are skipped or are deleted with the surrounding display area. However, in the second embodiment, in the scroll display, the image forming apparatus 10 passes the operation input items having the prohibition relation with the operation input item which has been set, through the display unit 31 at a higher speed than the operation input items which do not have the above prohibition relation.

In the second embodiment, each of the image forming apparatus 10 and the portable terminal 40 has the same hardware configuration as that of the first embodiment. Further, in the second embodiment, the different parts from the first embodiment will be explained and the explanation of the same parts as the first embodiment will be appropriately omitted.

Figure 12:
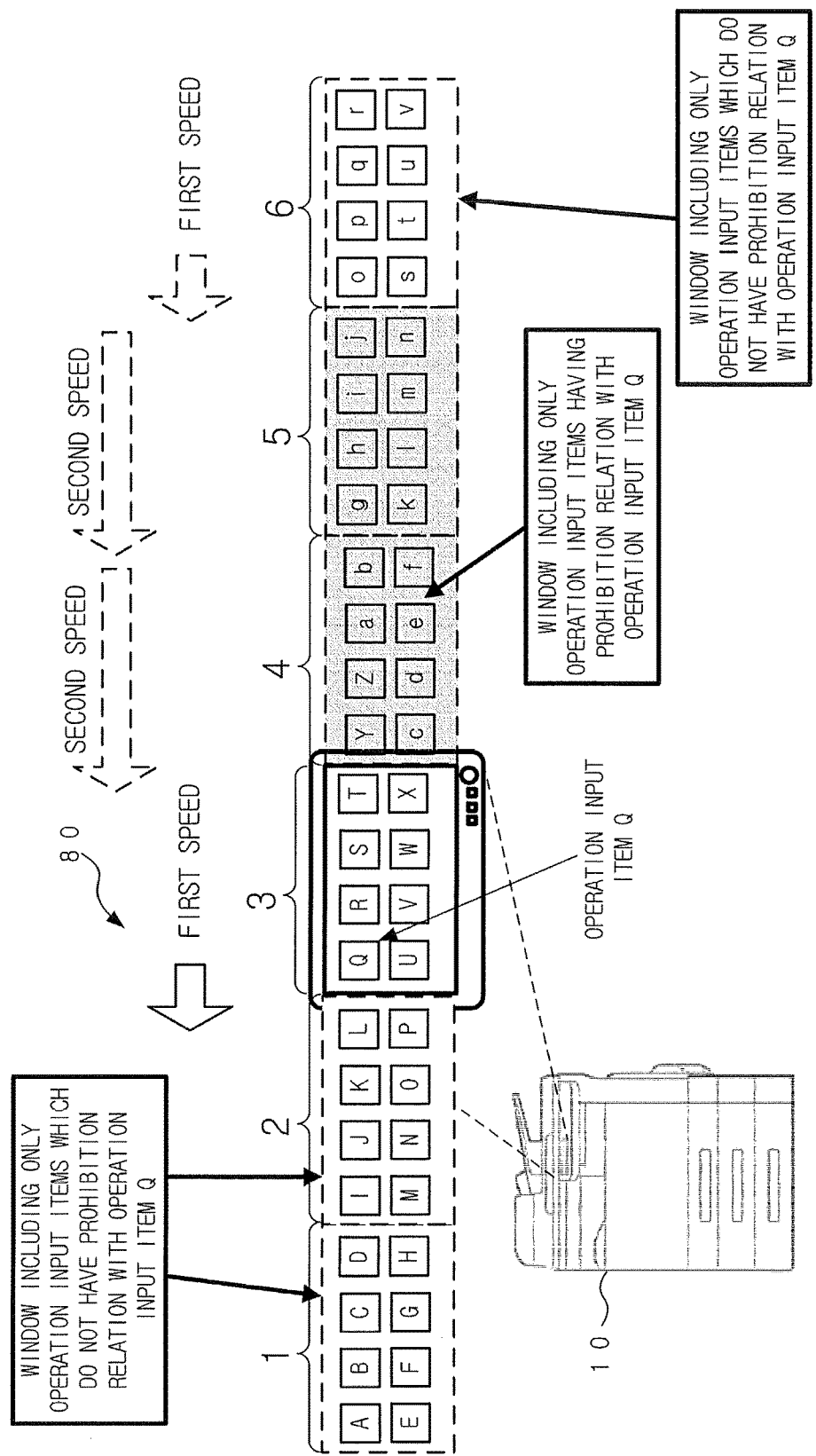
FIG. 12 is a view showing the situation in which the scroll speed becomes high when the operation input item in which the prohibited setting is caused in case that the operation input item is set, is displayed in the second embodiment.

FIG. 12 shows each speed at which each operation input item passes through the display unit 31 in case that the whole window 80 is scrolled in the right direction in the situation in which the operation input item Q has been set.

In FIG. 12, like the case shown in FIGS. 6 to 8, all of the operation input items arranged in the fourth area and the fifth area are the operation input items having the prohibition relation with the operation input item Q. Therefore, when the scroll is carried out, the image forming apparatus 10 passes the operation input items arranged in the fourth area and the fifth area through the display unit 31 at a higher speed than the other operation input items.

In FIG. 12, the image forming apparatus 10 passes the operation input items arranged in the areas except the fourth area and the fifth area through the display unit 31 at the first speed. The image forming apparatus 10 passes the operation input items arranged in the fourth area and the fifth area through the display unit 31 at the second speed which is higher than the first speed. Therefore, it is possible to shorten the display time for displaying the operation input items having the prohibition relation with the operation input item Q.

In case that the operation input item Q is set, because it is not necessary to receive the operation for the operation input items having the prohibition relation with the operation input item Q, it is not meaningful to display the above operation input items. Therefore, by increasing the speed at which the operation input items having the prohibition relation with the operation input item Q pass through the display unit 31 and by shortening the display time, it is possible to shorten the time which elapses before the operation input item to be displayed after the operation input items having the prohibition relation with the operation input item Q is displayed in the scroll display.

In the scroll display, the gaze detection unit 21 detects the gaze of the user who carries out the scroll instruction. In case that the user's gaze directing to the display unit 31 is not detected, that is, in case that the image forming apparatus 10 recognizes that the user does not view the operation panel 30, the image forming apparatus 10 passes the operation input items having the prohibition relation with the operation input item which has been set (in FIG. 12, the operation input items arranged in the fourth area and the fifth area) through the display unit 31 at the third speed which is higher than the second speed. Therefore, it is possible to more shorten the display time for displaying the operation input items having the prohibition relation with the operation input item which has been set.

In case that in the column in which the operation input item having the prohibition relation with the operation input item which has been set is arranged, the operation input item which does not have the above prohibition relation is arranged, the image forming apparatus 10 passes the above column through the display unit 31 at the first speed without increasing the speed.

Figure 13:
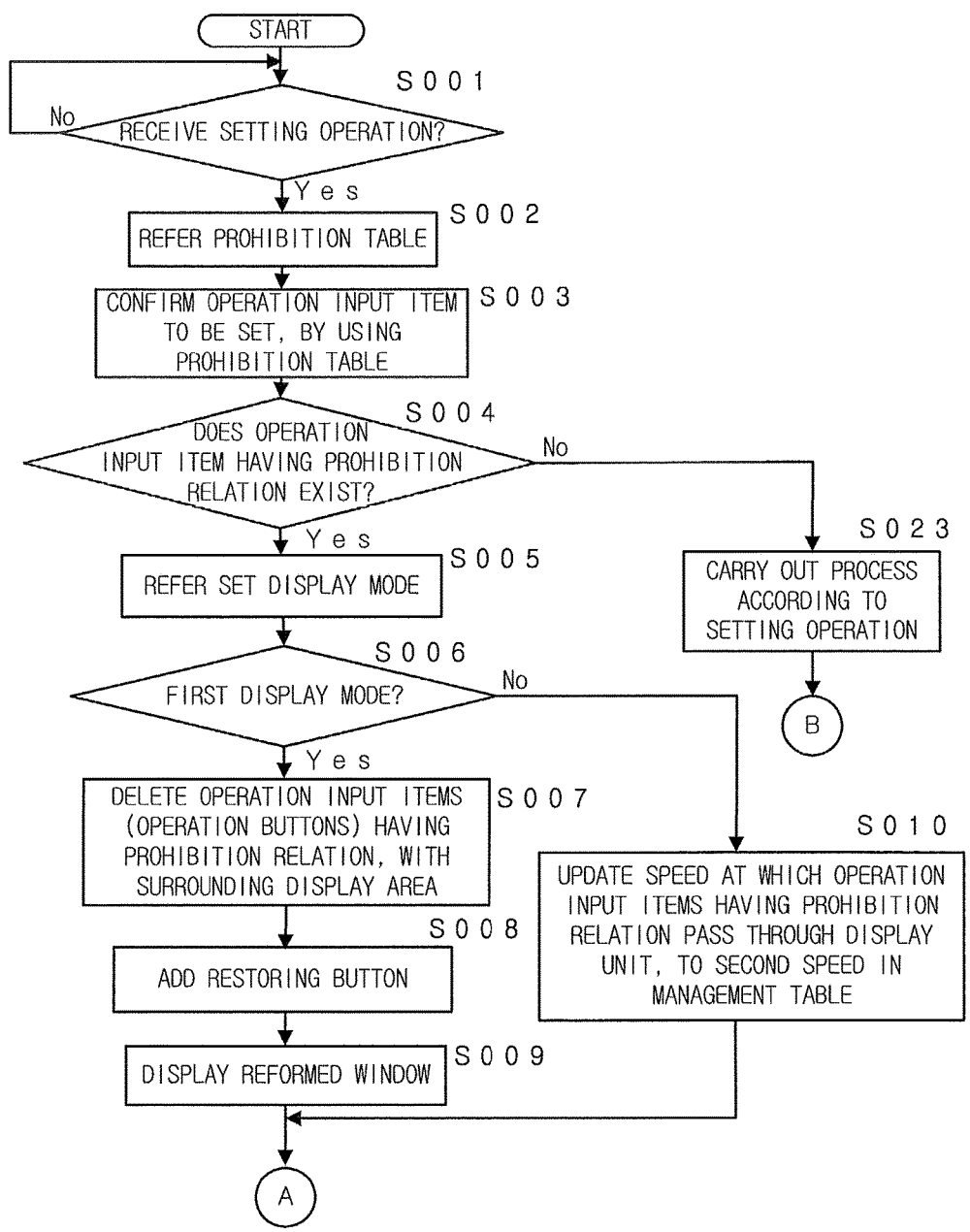
FIG. 13 is a flowchart showing the process which is carried out in case that the setting operation is received in the image forming apparatus according to the first and the second embodiments.
Figure 14:
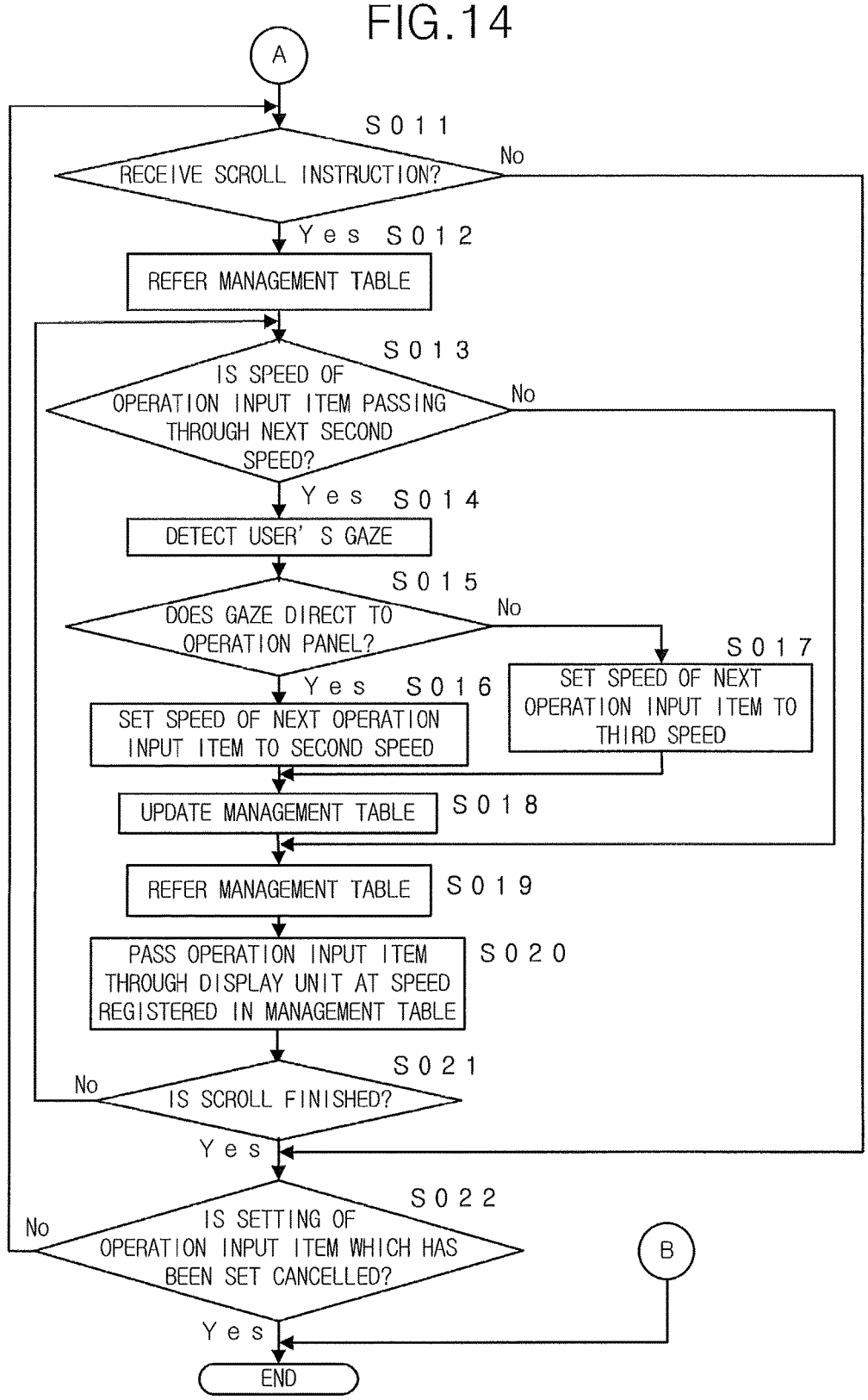
FIG. 14 is a flowchart following the flowchart shown in FIG. 13, which shows the process which is carried out in case that the scroll instruction is received.

FIGS. 13 and 14 show the flowchart of the process for carrying out the scroll display after the setting operation is received.

The image forming apparatus 10 has a first display mode and a second display mode as the display mode for the scroll display. The first display mode is a display mode for deleting the operation input items having the prohibition relation with the operation input item which has been set, with the surrounding display area. The second display mode is a display mode for passing the operation input items having the prohibition relation with the operation input item which has been set, through the display unit 31 at a higher speed than the other operation input items in the scroll display.

In FIGS. 13 and 14, by previously receiving the selection operation from a user, the display mode to be used for the display control is set to one of the first display mode and the second display mode.

FIG. 13 shows the process which is carried out when the setting operation is received. The image forming apparatus 10 waits for the reception of the setting operation from a user (Step S001; No in FIG. 13). When the image forming apparatus 10 receives the setting operation (Step S001; Yes), the image forming apparatus 10 refers the prohibition table stored in the hard disk drive 15 (Step S002), and confirms the operation input items having the prohibition relation with the operation input item which has been set, by using the prohibition table (Step S003).

In case that the operation input item having the prohibition relation with the operation input item which has been set, does not exist (Step S004; No), the image forming apparatus 10 carries out the process according to the received setting operation (Step S023). Then, the process is ended.

In case that the operation input item having the prohibition relation with the operation input item which has been set, exists (Step S004; Yes), the image forming apparatus 10 checks whether the set display mode is the first display mode or the second display mode (Step S005).

In case that the second display mode is set (Step S006; No), the image forming apparatus 10 reads out the management table 36 which is stored in the hard disk drive 15 and in which each speed at which each operation input item passes through the display unit 31 in the scroll display is registered. In the management table 36, the first speed is registered as the initial value of the speed at which each operation input item passes through the display unit 31. Then, the image forming apparatus 10 updates the speed at which the operation input item having the prohibition relation with the operation input item which has been set passes through the display unit 31, from the first speed to the second speed (Step S010). The process proceeds to Step S011 shown in FIG. 14.

In case that the first display mode is set (Step S006; Yes), the image forming apparatus 10 deletes the operation input items having the prohibition relation with the operation input item which has been set, with the surrounding display area from the whole window 80 so as not to display the above operation input items (Step S007), and adds the restoring button (Step S008). Then, the image forming apparatus 10 displays a predetermined portion of the whole window 80 which is reformed in Step S007 and Step S008, on the display unit 31 (Step S009). The process proceeds to Step S011 shown in FIG. 14.

FIG. 14 shows the process which is carried out after the scroll instruction is received. In case that the image forming apparatus 10 does not receive the scroll instruction via the operation panel 30 (Step S011; No), the process proceeds to Step S022.

In case that the image forming apparatus 10 receives the scroll instruction via the operation panel 30 (Step S011; Yes), the image forming apparatus 10 refers the management table 36 (Step S012), and confirms the speed which is registered so as to relate to the operation input item which passes through the display unit 31 next.

In case that the speed which is registered in the management table 36 and which is related to the operation input item passing through the display unit 31 next, is the second speed (Step S013; Yes), the gaze detection unit 21 detects the gaze of the user who carries out the scroll instruction via the operation panel 30 (Step S014).

In case that the user's gaze directs to the operation panel 30 (Step S015; Yes), the image forming apparatus 10 rewrites (updates) the management table 36 so as to set the speed of the operation input item which passes through the display unit 31 next, to the second speed (Step S016 and Step S018). The process proceeds to Step S019.

In case that the user's gaze does not direct to the operation panel 30 (Step S015; No), the image forming apparatus 10 rewrites (updates) the management table 36 so as to set the speed of the operation input item which passes through the display unit 31 next, to the third speed (Step S017 and Step S018). The process proceeds to Step S019.

The image forming apparatus 10 refers the management table 36 in Step S019 and passes the next operation input item at the speed which is registered in the management table 36 (Step S020).

In case that in the column including the operation input item which passes through the display unit 31 next, the operation input item which does not have the prohibition relation with the operation input item which has been set is arranged, the image forming apparatus 10 passes the above column at the first speed.

Until the scroll is finished (Step S021; No), the process is continued by returning to Step S013.

In case that the scroll is finished (Step S021; Yes), until the setting of the operation input item, which is carried out in Step S001 shown in FIG. 13, is cancelled (Step S022; No), the process is continued by returning to Step S011. In case that the setting of the operation input item, which is carried out in Step S001 shown in FIG. 13, is cancelled (Step S022; Yes), the process is ended.

When the process is ended, the management table 36 is reset (updated) so as to set all of the registered speeds at which the respective operation input items pass through the display unit 31, to the first speed.

In this process, for example, in case that a new setting operation is received in Step S011 or in Step S021, the process is continued by returning to Step S002.

As described above, the image forming apparatus 10 skips the operation input items having the prohibition relation with the operation input item which has been set by receiving the setting operation from a user or deletes the operation input items having the above prohibition relation, with the surrounding display area. Alternatively, the image forming apparatus 10 passes the operation input items having the above prohibition relation through the display unit 31 at a higher speed than the other operation input items in the scroll display. As a result, the display time for displaying the operation input items having the above prohibition relation is shortened. Therefore, the time which elapses before the operation input item to be displayed after the operation input items having the prohibition relation with the operation input item which has been set is displayed, is shortened.

Third Embodiment

In the first embodiment and the second embodiment, by displaying a plurality of operation input items arranged in the whole window 80 in the scroll display, the setting operation is received. In the third embodiment, a plurality of windows in which the operation input items are arranged constitute a hierarchical type of menu having a tree structure. By tracing the hierarchical type of menu, the setting operation relating to the printing is received.

In the third embodiment, each of the image forming apparatus 10 and the portable terminal 40 has the same hardware configuration as that of the first embodiment and the second embodiment. Further, in the third embodiment, the different parts from the first embodiment and the second embodiment will be explained and the explanation of the same parts as the first embodiment and the second embodiment will be appropriately omitted.

Figure 15:
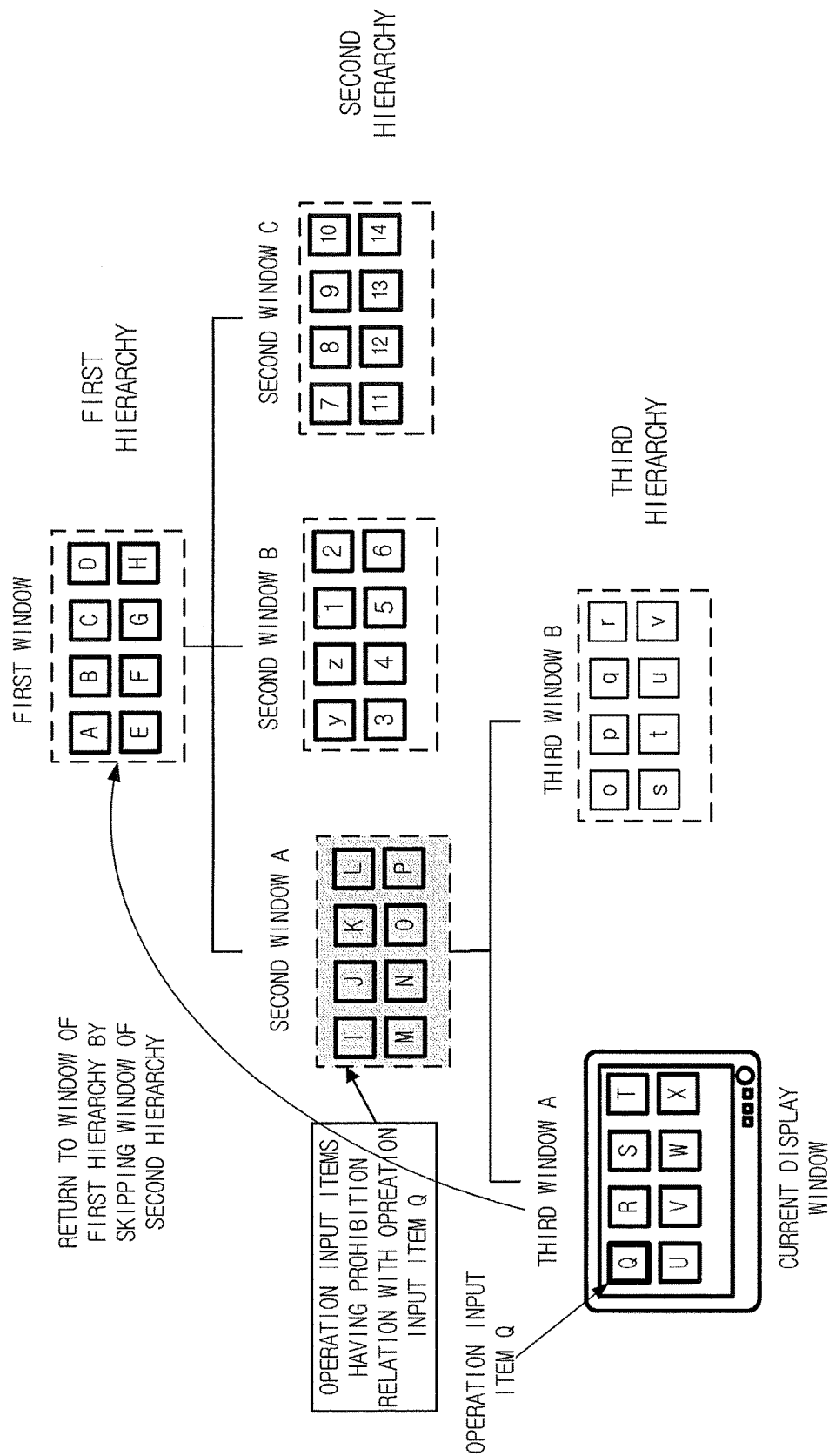
FIG. 15 is a view showing the situation in which the window change is carried out by not displaying the window for displaying only the operation input items in which the prohibited setting is caused in case that the operation input item is set.

FIG. 15 shows a plurality of windows in the hierarchical type of menu, which are displayed by the image forming apparatus 10 in the third embodiment. In FIG. 15, in case that the image forming apparatus 10 receives the setting operation in the window of the first hierarchy which is the uppermost hierarchy, the window of the first hierarchy is changed to the window of the next lower hierarchy (second hierarchy), which corresponds to the operation input item set in accordance with the received setting operation. Further, in case that the image forming apparatus 10 receives the setting operation in the window of the second hierarchy, the window of the second hierarchy is changed to the window of the next lower hierarchy (third hierarchy), which corresponds to the operation input item set in accordance with the received setting operation.

In FIG. 15, the first window is shown as the window of the first hierarchy; the second window A, the second window B and the second window C are shown as the windows of the second hierarchy, to which the first window is changed; and the third window A and the third window B are shown as the windows of the third hierarchy, to which the second window A is changed. In FIG. 15, in order to trace the hierarchical type of menu from the first window to the third window A, it is necessary to pass through the second window A. Therefore, in case that the third window A is displayed by tracing the hierarchical type of menu, it follows that the arrangement order of the windows is defined as the order of the first window, the second window A and the third window A.

In case that the return button of the switch unit 33 is pressed down by a user, the image forming apparatus 10 returns the window which is displayed on the display unit 31, to the window which was displayed just before changing the window. For example, when the return button is pressed down in the situation in which the third window A is displayed, the window is returned to the second window A which was displayed just before changing the window to the third window A. When the return button is pressed down in the situation in which the second window A is displayed, the window is returned to the first window which was displayed just before changing the window to the second window A. For example, in case that the third window A is displayed, the image forming apparatus 10 returns the window so as to trace back the hierarchical type of menu in the defined arrangement order of the first window, the second window A and the third window A.

In the third embodiment, in case that a certain window is changed to the predetermined window in the defined arrangement order so as to pass through the specified window in which all of the arranged operation input items have the prohibition relation with the operation input item which has been set, the specified window is not displayed when the window change is carried out. Therefore, it is possible to shorten the display time for displaying the specified window in which all of the arranged operation input items have the prohibition relation with the operation input item which has been set. As a result, it is possible to shorten the time which elapses before the window to be displayed after the specified window is displayed.

In FIG. 15, the operation input item Q is set in the third window A. All of the operation input items arranged in the second window A have the prohibition relation with the operation input item Q. When the return button is pressed down in the situation in which the operation input item Q is set and the third window A is displayed, the window is returned to the first window by not displaying the second window A.

In case that the operation input item Q is set, because it is not necessary to receive the operation for the operation input items having the prohibition relation with the operation input item Q, it is not meaningful to display the window in which all of the arranged operation input items have the prohibition relation with the operation input item Q. Therefore, by not displaying the above window when the window change is carried out, it is possible to shorten the time which elapses before the window to be displayed after the above window is displayed.

In case that the operation input item having the prohibition relation with the operation input item which has been set and the operation input item which does not have the above prohibition relation are mixed in one window, the above window is displayed when the window change is carried out.

As described above, in the third embodiment, in case that the window change is carried out so as to pass through the window in which all of the arranged operation input items have the prohibition relation with the operation input item which has been set, the above window is not displayed when the window change is carried out. Therefore, it is possible to shorten the display time for displaying the window in which all of the arranged operation input items have the prohibition relation with the operation input item which has been set. As a result, it is possible to shorten the time which elapses before the window to be displayed after the above window is displayed.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the embodiments, the image forming apparatus 10 is explained as an example of the image processing apparatus.

However, the image processing apparatus is not limited to this. The image processing apparatus or the operation display device may be configured by the CPU 11, the ROM 12, the RAM 13, the nonvolatile memory 14, the network communication unit 20 and the operation panel 30 of the image forming apparatus 10. Further, the program for causing an information processing apparatus to function as the above image processing apparatus or the above operation display device, may be adopted. The operation display method for carrying out the process explained in the embodiments may be adopted.

In the third embodiment, in case that the return button is pressed down, the window change is carried out by not displaying the window in which only the operation input items having the prohibition relation are arranged. The case in which the above window is not displayed when the window change is carried out, is not limited to this. In case that it is determined that the first window is changed to the third window so as to pass through the second window, the first window may be changed to the third window by not displaying the second window.

One of the objects of the above embodiments is to provide the operation display device, the image processing apparatus, the non-transitory computer-readable recording medium and the operation display method which can reduce the user's task for searching the intended operation input item.

In at least one of the above embodiments, the display unit displays a group of operation input items among a plurality of operation input items which are arranged in an arrangement order which is previously defined, and when the moving instruction operation for moving a position of the group of operation input items (display position) in a moving direction in accordance with the arrangement order is received, the position of the group of operation input items is moved so as to shorten a first display time for displaying one or more operation input items having a prohibition relation with the operation input item which has been set by receiving the setting operation as compared with a second display time for displaying each of the other operation input items. For example, the first display time is shortened by skipping the operation input items having the prohibition relation with the operation input item which has been set or by increasing the scroll speed as compared with that of the other operation input items. When the display position is moved, it is possible to shorten the time which elapses before the operation input item which is arranged after the operation input items having the prohibition relation with the operation input item which has been set is displayed. Therefore, it is possible to reduce the user's task for searching the intended operation input item. The method for moving the operation input items may be a method for sliding the display position, or a method for changing the display position by a constant amount at one time. For example, in case that a plurality of operation input items are arranged so as to be divided into a plurality of windows and the group of operation input items are displayed by displaying one of the plurality of windows, the window change for changing one window to another window is included in the above moving of the position of the group of operation input items.

In at least one of the above embodiments, the operation input items having the prohibition relation with the operation input item which has been set are skipped or are deleted with the surrounding display area of the operation input items to be deleted. Therefore, it is possible to quickly display the operation input item which is arranged after the operation input items which are skipped or are deleted with the surrounding display area.

In at least one of the above embodiments, a plurality of operation input items are arranged so as to form a plurality of columns and to arrange a plurality of columns in parallel, and the display position is moved in the direction along which a plurality of columns are arranged. Then, in case that the operation input item which does not have the prohibition relation with the operation input item which has been set exists on the same column with one operation input item having the prohibition relation with the operation input item which has been set, the display position is moved without shortening the first display time for displaying the one operation input item as compared with the second display time for displaying each of the other operation input items. Therefore, it is possible to avoid the situation in which the display time for displaying the operation input item which does not have the prohibition relation with the operation input item which has been set is shortened by shortening the first display time for displaying the operation input item having the prohibition relation with the operation input item which has been set.

In at least one of the above embodiments, by scrolling the operation input items having the prohibition relation with the operation input item which has been set at a higher speed than the other operation input items, the time which is required to pass the operation input items having the prohibition relation with the operation input item which has been set, through the display screen, is more shortened as compared with a normal case.

In at least one of the above embodiments, in case that the user's gaze which directs to the display unit is not detected when the display position is scrolled, the operation input items having the prohibition relation with the operation input item which has been set are scrolled at the third speed which is higher than the second speed. Therefore, in case that the use does not view the display unit, the display time for displaying the operation input items having the prohibition relation with the operation input item which has been set, is more shortened.

In at least one of the above embodiments, a plurality of operation input items are arranged so as to be divided into a plurality of windows. Further, by displaying one of a plurality of windows and by changing one window to another window, each operation input item is displayed. Then, only in case of the window in which all of the arranged operation input items have the prohibition relation with the operation input item which has been set, the display time is shortened as compared with the display time for displaying each of the other windows. Therefore, in case that the operation input items which do not have the prohibition relation with the operation input item which has been set, and the operation input items having the prohibition relation with the operation input item which has been set are simultaneously displayed, the display time for displaying the operation input items which do not have the prohibition relation with the operation input item which has been set, is not shortened.

According to the operation display device, the image processing apparatus, the non-transitory computer-readable recording medium and the operation display method, it is possible to reduce the user's task for searching the intended operation input item.

The present U.S. patent application claims the priority of Japanese Patent Application No. 2013-200913 filed on Sep.

27, 2013, according to the Paris Convention, and the entirety of which is incorporated herein by reference for correction of incorrect translation.

What is claimed is:

1. An operation display device, comprising:
a display configured to display a group of operation input items among a plurality of operation input items which are arranged in an arrangement order which is previously defined, wherein each of the operation input items corresponds to a particular function to be set;
a hardware processor configured to operate an image processing apparatus having the display so as to:
receive a setting operation to set an operation input item from the group of operation input items;
prohibit one or more of the plurality of other operation input items having a prohibition relation with the set operation input item from the group of operation input items;
wherein the prohibition relation prevents one or more of the plurality of operation input items from being set when the function or functions of the one or more of the plurality of operation input items is or are not compatible with a function corresponding to the set one of the operation input items;
receive a moving instruction operation for moving a position of the group of operation input items relative to a plurality of other operation input items in a moving direction in accordance with the arrangement order, and
instruct the display to move the position of the group of operation input items for revealing displaying of one or more of the plurality of other operation input items having the prohibition relation in a first display time, as compared to moving in a second display time for revealing displaying of one or more of the plurality of other operation input items not having the prohibition relation, wherein the first display time is shorter than the second display time.

2. The operation display device of claim 1, wherein the hardware processor shortens the first display time by not displaying the operation input items having the prohibition relation with the operation input item which has been set.

3. The operation display device of claim 2, wherein the hardware processor instructs the display not to display the operation input items having the prohibition relation with the operation input item which has been set, by skipping the operation input items having the prohibition relation, or by deleting the operation input items having the prohibition relation, with a surrounding display area of the operation input items to be deleted.

4. The operation display device of claim 1, wherein the plurality of operation input items are arranged so as to form a plurality of columns each of which includes two or more operation input items and each of which extends in a direction perpendicular to the moving direction, and so as to arrange the plurality of columns along the moving direction, and
wherein in case that only the operation input items having the prohibition relation with the operation input item which has been set are arranged in one column with one operation input item having the prohibition relation, when the position of the group of operation input items is moved, the hardware processor shortens the first display time for displaying the one operation input item having the prohibition relation as compared with the second display time for displaying each of the other operation input items.

5. The operation display device of claim 1, wherein the hardware processor instructs the display to move the position of the group of operation input items by scrolling the operation input items, and shortens the first display time by scrolling the operation input items having the prohibition relation with the operation input item which has been set, at a second speed which is higher than a first speed at which the other operation input items are scrolled.

6. The operation display device of claim 5, further comprising a sensor configured to detect a user's gaze,
wherein in case that the sensor does not detect the user's gaze which directs to the display when the operation input items are scrolled, the hardware processor instructs the display to scroll the operation input items having the prohibition relation with the operation input item which has been set, at a third speed which is higher than the second speed.

7. The operation display device of claim 1, wherein the plurality of operation input items are arranged so as to be divided into a plurality of windows,
the group of operation input items are displayed by displaying one of the plurality of windows,
the position of the group of operation input items is moved by changing one window to another window; and
when the position of the group of operation input items is moved, the hardware processor shortens the first display time for displaying each of only the windows in which all of the arranged operation input items have the prohibition relation with the operation input item which has been set, as compared with the second display time for displaying each of the other windows.

8. An image processing apparatus, comprising: an operation display device comprising:
a display configured to display a group of operation input items among a plurality of operation input items which are arranged in an arrangement order which is previously defined, wherein each of the operation input items corresponds to a particular function to be set;
a hardware processor configured to operate the image processing apparatus having the display so as to:
receive a setting operation to set an operation input item from the group of operation input items;
prohibit one or more of the plurality of other operation input items having a prohibition relation with the set operation input item from the group of operation input items;
wherein the prohibition relation prevents one or more of the plurality of operation input items from being set when the function or functions of the one or more of the plurality of operation input items is or are not compatible with a function corresponding to the set one of the operation input items;
receive a moving instruction operation for moving a position of the group of operation input items relative to a plurality of other operation input items in a moving direction in accordance with the arrangement order, and
instruct the display to move the position of the group of operation input items for revealing displaying of one or more of the plurality of other operation input items having the prohibition relation in a first display time, as compared to moving in a second display time for revealing displaying of one or more of the plurality of other operation input items not having the prohibition relation, wherein the first display time is shorter than the second display time, and an image processor configured to carry out an image processing in accordance with the setting operation received by the operation display device.

9. An operation display method for an image processing apparatus comprising a display, the method comprising:
receiving a setting operation to set an operation input item from the group of operation input items;
prohibiting one or more of the plurality of other operation input items having a prohibition relation with the set operation input item from the group of operation input items;
wherein the prohibition relation prevents one or more of the plurality of operation input items from being set when the function or functions of the one or more of the plurality of operation input items is or are not compatible with a function corresponding to the set one of the operation input items;
receiving a moving instruction operation for moving a position of a group of operation input items relative to a plurality of other operation input items on the display in a moving direction in accordance with the arrangement order; and
moving the position of the group of operation input items; and
displaying the group of operation input items on the display for revealing displaying of one or more of the plurality of other operation input items having the prohibition relation in a first display time, as compared to a second display time for revealing displaying of one or more of the plurality of other operation input items not having the prohibition relation, wherein the first display time is shorter than the second display time.

10. The operation display method of claim 9, wherein in the displaying, the first display time is shortened by not displaying the operation input items having the prohibition relation with the operation input item which has been set.

11. The operation display method of claim 10, wherein in the displaying, the operation input items having the prohibition relation with the operation input item which has been set are not displayed by skipping the operation input items having the prohibition relation, or by deleting the operation input items having the prohibition relation, with a surrounding display area of the operation input items to be deleted.

12. The operation display method of claim 9, wherein the plurality of operation input items are arranged so as to form a plurality of columns each of which includes two or more operation input items and each of which extends in a direction perpendicular to the moving direction, and so as to arrange the plurality of columns along the moving direction, and wherein in the displaying, in case that only the operation input items having the prohibition relation with the operation input item which has been set are arranged in one column with one operation input item having the prohibition relation, when the position of the group of operation input items is moved, the first display time for displaying the one operation input item having the prohibition relation is shortened as compared with the second display time for displaying each of the other operation input items.

13. The operation display method of claim 9, wherein in the displaying, the position of the group of operation input items is moved by scrolling the operation input items, and the first display time is shortened by scrolling the operation input items having the prohibition relation with the operation input item which has been set, at a second speed which is higher than a first speed at which the other operation input items are scrolled.

14. The operation display method of claim 13, further comprising detecting a user's gaze,
wherein in the displaying, in case that the user's gaze which directs to the display is not detected when the operation input items are scrolled, the operation input items having the prohibition relation with the operation input item which has been set are scrolled at a third speed which is higher than the second speed.

15. The operation display method of claim 9, wherein the plurality of operation input items are arranged so as to be divided into a plurality of windows,
the group of operation input items are displayed by displaying one of the plurality of windows,
the position of the group of operation input items is moved by changing one window to another window; and
in the displaying, when the position of the group of operation input items is moved, the first display time for displaying each of only the windows in which all of the arranged operation input items have the prohibition relation with the operation input item which has been set, is shortened as compared with the second display time for displaying each of the other windows.

16. The image processing apparatus of claim 8, wherein the image processing apparatus has a function of executing one of a copy job, a scan job and a print job.

17. The image processing of claim 8, wherein the operation input items are displayed to receive the setting operation for inputting the job.

18. The operation display method of claim 9, wherein the image forming apparatus has a function of executing one of a copy job, a scan job and a print job.

* * * * *